US005543270A

United States Patent [19]

Akao et al.

[11] Patent Number: 5,543,270

[45] Date of Patent: Aug. 6, 1996

[54] MOLDED ARTICLE FOR PHOTOGRAPHIC PHOTOSENSITIVE MATERIAL, MOLDING METHOD AND PACKAGE

[75] Inventors: Mutsuo Akao; Osamu Suzuki, both of Minami-ashigara, Japan

[73] Assignee: Fuji Photo Film Co., Ltd., Kanagawa, Japan

[21] Appl. No.: 233,978

[22] Filed: Apr. 28, 1994

[30] Foreign Application Priority Data

Apr. 28, 1993 [JP] Japan .................................... 5-103063

[51] Int. Cl.$^6$ ............................ G03C 3/00; C08L 51/04; C08L 53/00

[52] U.S. Cl. .......................... 430/347; 430/496; 430/501; 206/578; 206/316.1; 206/316.2; 206/389; 206/455; 206/416; 428/349; 428/408

[58] Field of Search .................................... 430/496, 501, 430/347; 206/578, 316.1, 316.2, 389, 455, 416; 428/349, 408

[56] References Cited

U.S. PATENT DOCUMENTS

| | | | |
|---|---|---|---|
| 4,440,824 | 4/1984 | Bonis | 428/349 |
| 4,796,823 | 1/1989 | Akao et al. | 242/71.8 |
| 4,989,802 | 2/1991 | Akao et al. | 242/610.6 |

*Primary Examiner*—Mark F. Huff
*Attorney, Agent, or Firm*—Sughrue, Mion, Zinn, Macpeak & Seas

[57] ABSTRACT

A molded article for a photographic photosensitive material formed of a resin composition comprising of (a) 50 wt. % or more of a rubber-containing aromatic monovinyl resin having a melt flow index of 3 to 40 g/10 minutes, a bending elastic modulus of 20,000 kg/cm$^2$ or more and a Vicat softening point of 78° C. or more and containing 1 to 12 wt. % of a rubber material, (b) 0.1 to 10 wt. % of a light-shielding material, and (c) 0.01 to 20 wt. % of at least one of a lubricant and an antistatic agent. The molded article is excellent in physical strength, photographic properties, injection moldability and the like.

30 Claims, 4 Drawing Sheets

FIG. 4
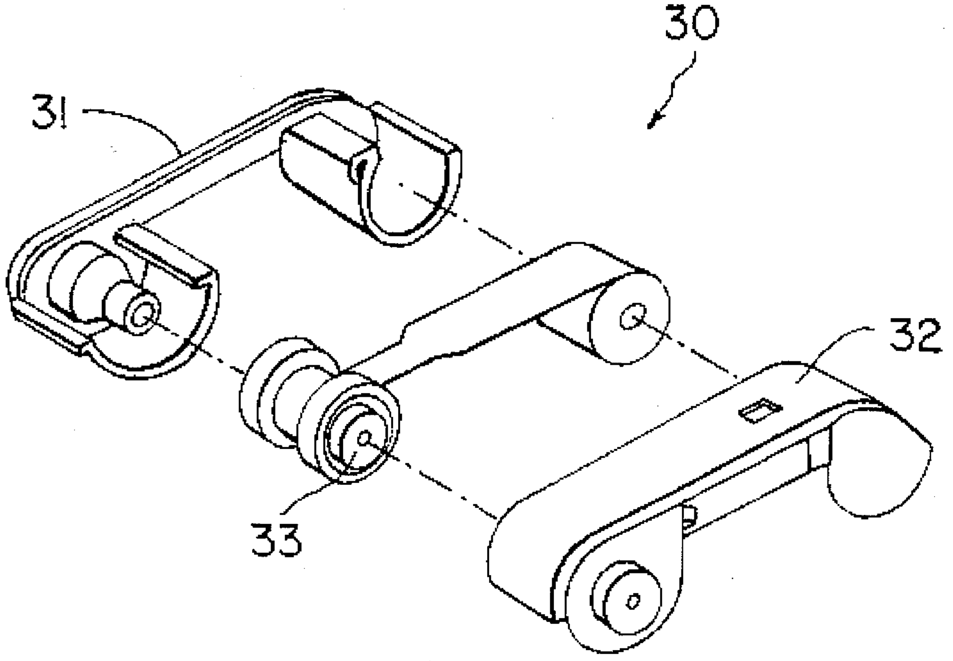
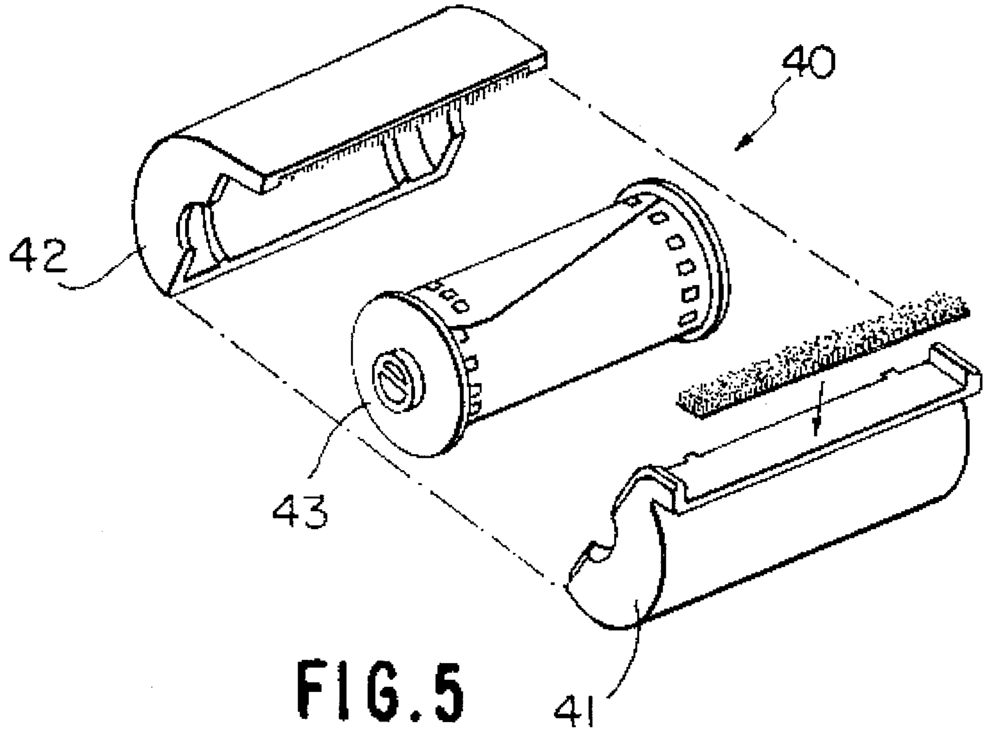
FIG. 5

FIG.8
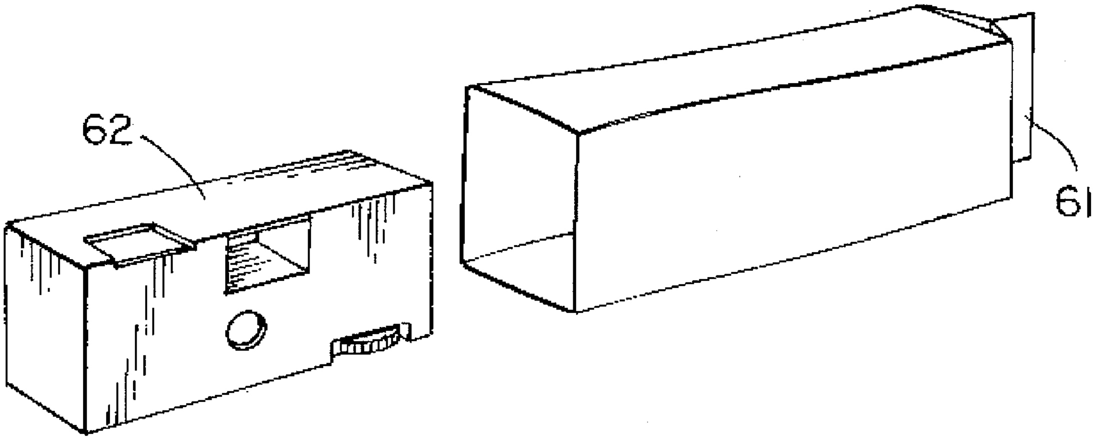
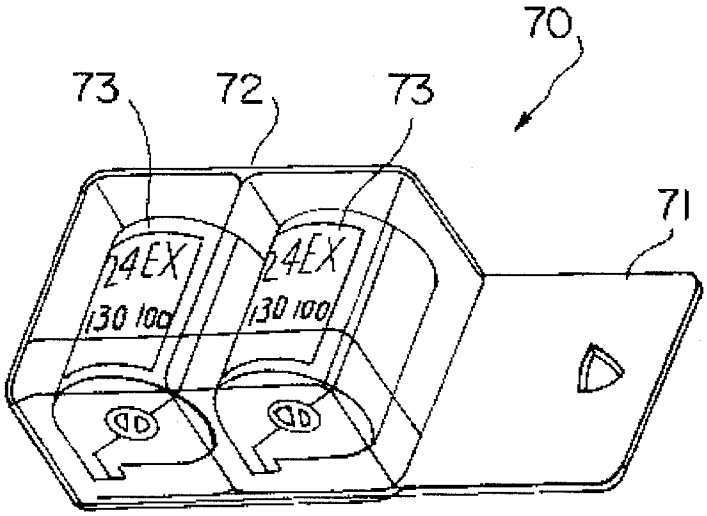
FIG.9

MOLDED ARTICLE FOR PHOTOGRAPHIC PHOTOSENSITIVE MATERIAL, MOLDING METHOD AND PACKAGE

BACKGROUND OF THE INVENTION

This invention relates to a molded article excellent in dimensional stability, physical strength and the like used for packaging a photographic film, etc., a manufacturing method and a package using the same.

Heretofore, molded articles for a photographic photosensitive material, such as spools for a 35 mm photographic film loaded in a cartridge, cores for a movie film, photographic film units with a lens, and cartridges for a photographic film, are formed of various resin compositions. For example, a spool for a 35 mm photographic film loaded in a cartridge (Japanese Utility Model KOKOKU No. 61-36995, etc.) is formed of polystyrene resin or high impact polystyrene resin, and a core for a movie film (Japanese Utility Model KOKOKU No. 2-37799) is formed of polypropylene resin, polystyrene resin, ABS resin or the like. A photographic film unit with a lens (Japanese Patent KOKAI No. 63-226643) is formed of high impact polystyrene resin having a low melt flow index blended with carbon black, and a cartridge for a photographic film (Japanese Patent KOKAI No. 1-312538) is formed of high impact polystyrene resin blended with carbon black.

However, the above molded articles for a photographic photosensitive material have various problems in their resin compositions.

That is, the resin composition used for the spool is inferior in moldability, heat resistance, dimensional stability and wear resistance, and occasionally affects photographic properties adversely. The resin composition used for the core for a movie film cannot be, in the case of a roll of a long length film, blended with an additive imparting slipperiness to the surface of the core such as a lubricant and a surfactant, because the roll tends to become into a form of cone, and accordingly, synthetic rubber or the like is added in order to prevent the slip of the rolled film. As a result, the resin composition is inferior in injection moldability and wear resistance. The resin composition used for the photographic film unit with a lens occasionally adversely affects photographic properties, and weld lines frequently occur to degrade appearance. Moreover, physical strength is low. The resin composition used for the cartridge for a photographic film is desired to improve photographic properties, heat resistance, appearance, physical strength and the like, and weld lines strongly occur. In brief, the resin compositions used for molded articles for a photographic photosensitive material are inferior in physical strength, photographic properties, injection moldability and the like.

SUMMARY OF THE INVENTION

An object of the invention is to provide a molded article for a photographic photosensitive material which has solved the above problems and which is excellent in physical strength, photographic properties, injection moldability and the like.

Another object of the invention is to provide a manufacturing method of a molded article for a photographic photosensitive material capable of manufacturing the above molded article under preferable conditions.

Still another object of the invention is to provide a package for a photographic photosensitive material using the molded article capable of keeping good photographic properties for a long time.

The present invention provides a molded article for a photographic photosensitive material which has achieved the above objects which is formed of a resin composition comprising of (a) 50 wt. % or more of a rubber-containing aromatic monovinyl resin having a melt flow index of 3 to 40 g/10 minutes, a bending elastic modulus of 20,000 $kg/cm^2$ or more and a Vicat softening point of 78° C. or more and containing 1 to 12 wt. % of a rubber material, (b) 0.1 to 10 wt. % of a light-shielding material, and (c) 0.01 to 20 wt. % of at least one of a lubricant and an antistatic agent.

The present invention provides another molded article for a photographic photosensitive material which also has achieved the above objects which is formed of a resin composition comprising of (a) 50 wt. % or more of a rubber-containing aromatic monovinyl resin having a melt flow index of 3 to 40 g/10 minutes, a bending eastic modulus of 20,000 $kg/cm^2$ or more and a Vicat softening point of 78° C. or more and containing 1 to 12 wt. % of a rubber material, (b) 0.1 to 10 wt. % of a light-shielding material, and (c) 0.01 to 10 wt. % of an inorganic substance having ion-exchange ability.

The present invention provides another molded article for a photographic photosensitive material which also has achieved the above objects which is formed of a resin composition comprising of (a) 50 wt. % or more of a rubber-containing styrene resin having a melt flow index of 3 to 40 g/10 minutes, a bending elastic modulus of 20,000 $kg/cm^2$ or more and a Vicat softening point of 78° C. or more and containing 1 to 12 wt. % of a polybutadiene having a mean particle size of 0.1 to 7 μm, (b) 0.1 to 10 wt. % of carbon black having a mean particle size of 10 to 90 mμ, and (c) 0.01 to 20 wt. % of at least one of an organic polysiloxane, a fatty acid metal salt and a fatty acid amide compound.

The present invention provides another molded article for a photographic photosensitive material which also has achieved the above objects which is formed of a resin composition comprising of (a) 50 wt. % or more of a rubber-containing aromatic monovinyl resin containing a rubber material, (b) 0.01 to 20 wt. % of at least one of a lubricant and an antistatic agent, (c) 3 wt. % or more of a thermoplastic resin having experienced heat histories at 150° C. or more at least twice, (d) 0.1 to 10 wt. % of a light-shielding material, and (e) 0.01 to 20 wt. % of at least one of an antioxidant, a deodorant, an agent imparting fragrance, an oxygen scavenger and an inorganic substance having ion-exchange ability.

BRIEF DESCRIPTION OF DRAWINGS

FIG. 4 is an exploded perspective view of a photographic film cartridge which is a molded article for a photographic photosensitive material of the invention.

FIG. 5 is an exploded perspective view of another photographic film cartridge made of resin which is a molded article for a photographic photosensitive material of the invention.

FIG. 8 is a perspective view illustrating to package a photographic film unit with a lens into a packaging bag to form a package embodying the invention.

FIG. 9 is a perspective view of an assembly package of 35 mm photographic films loaded in a cartridge which is a package of a photographic photosensitive material of the invention.

Figure 1:
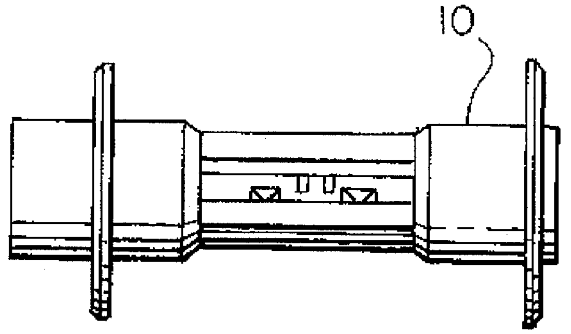
FIG. 1 is a front view of a photographic spool which is a molded article for a photographic photosensitive material of the invention.

10 . . . Photographic film spool

20 . . . Core for a photosensitive a long length strip material

30 . . . Photographic film cartridge

40 . . . Photographic film cartridge

50 . . . Photographic film unit with a lens

60 . . . Package of a photographic film unit with a lens

70 . . . Assembly package of photographic films

DETAILED DESCRIPTION OF THE INVENTION

As the rubber-containing aromatic monovinyl resin, there are embodiments of polymers of a rubber material and an aromatic monovinyl monomer, mixtures formed by mere blending a rubber material with an aromatic monovinyl resin, and mixtures of a polymer of a rubber material and aromatic monovinyl monomer and an aromatic monovinyl resin.

A suitable rubber material content of the rubber-containing aromatic monovinyl resin is 1 to 12 wt. %, preferably 1.5 to 10 wt. %, particularly preferably 2 to 8 wt. %. The content of less than 1 wt. % results in insufficient physical strength and wear resistance, particularly in insufficient dropping strength for photographic film spools, photographic film cartridges, instant film units, camera bodies, photographic film magazines and photographic film units with a lens which are frequently used under low temperature conditions of lower than 0° C. On the other hand, the content of more than 12 wt. % results in the increase of fogging by 0.03 or more and in the partial increase of sensitivity by 20% or more to generate uneven density in a print, with time during storing a photographic photosensitive material for 3 months or more in sealed conditions. Moreover, bending elastic modulus is decreased.

The rubber material is ethylene-propylene copolymer, ethylene-propylene-nonconjugative diene ternary copolymer, isoprene copolymer, polyisobutylene, styrene-isoprene copolymer, polybutadiene, styrene-butadiene copolymer and the like. The polybutadiene may be a high cis-polybutadiene preferably having a cis 1,4-bond content of 70 mol. % or more, particularly preferably 90 mol. % or more, or a low cis-polybudddiene having a low cis content.

A suitable mean particle size of the rubber material is 0.1 to 10 μm, preferably 0.2 to 7 μm, more preferably 0.5 to 5 μm, the most preferably 0.7 to 3.5 μm. The mean particle size of less than 0.1 μm results in the decrease of impact strength, and abrasion troubles frequently occur. The mean particle size of more than 10 μm results in a great surface roughness, and tensile strength decreases. In general, when the mean particle size is small, molded articles have a high gloss and surface smoothness. However, the surface tends to be damaged, and the polymerization cost increases. On the other hand, when the mean particle size is great, reflection decreases to lower gloss. Accordingly, in the case of obtaining a high gloss molded article, resin blended with a rubber material having a mean particle size of 0.1 to 1.5 μm, preferably 0.2 to 1 μm, is used. In the case of obtaining a mat molded article with a low gloss in order to prevent reflection, resin blended with a rubber material having a mean particle size of 1.5 to 10 μm, preferably 1.7 to 7 μm, particularly preferably 2 to 5 μm, is used. By using the rubber material having the greater particle size, fogging caused by light reflection can be avoided unless embossing is provided on the surface. However, to provide embossing is preferred because fogging caused by light reflection can be prevented more completely.

The mean particle size of the rubber material is determined by slicing the rubber material particle into very thin laminas by a microtome, photographing by a transmission electron microscope, and measuring each particle size of 600 particles of the rubber material in photographs. The mean particle size is calculated by the following formula.

$$\text{Mean Particle Size}=\Sigma nD^2/\Sigma nD$$

In the formula, n is particle size, and D is the number of particles of the rubber material.

The mean particle size of the rubber material can be controled by adjusting stirring conditions upon polymerization, viscosity of rubber material solution, or the like.

The aromatic monovinyl monomer includes styrene, alkylated styrenes at the nucleus, such as o-methylstyrene, p-methylstyrene, m-methylstyrene, 2,4-dimethylstyrene, ethylstyrene and p-tert-butylstyrene, halogenated styrenes at the nucleus, such as 2,4,6-tribromostyrene and 2,4,6-trichlorostyrene, α-alkyl substituted styrenes, such as α-methylstyrene and α-methyl-p-methylstyrene, and the like. In addition, methacrylate esters, acrylate esters, acrylonitrile and maleic anbydride, which are copolymerizable with a styrene monomer, are included.

Among the rubber-containing aromatic monovinyl resins, the polymer of a rubber material and an aromatic monovinyl monomer can be produced by the following polymerization methods, (A) Radical Polymerization ① Batch Bulk Polymerization
- Advantages . . . Produced in a simple process.
- Disadvantages . . . Difficulty in heat diffusion in a large scale production. Molecular weight distribution is broad, and moldability is inferior.

② Continuous Bulk Polymerization
- Advantages . . . Quality of the product is uniform. Manufacturing cost is cheap.
- Disadvantages . . . Transportation of a high viscosity reaction solution, and channeling phenomenon in a reaction tower.

③ Continuous Solution Polymerization
- Advantages . . . Control of polymerization heat is easy.
- Disadvantages . . . Removal of solvent is necessary. Stirring is difficult.

④ Suspension Polymerization
- Advantages . . . Removal of polymerization heat is possible. Granular polymer can be obtained. Residual amount of monomer is small.

Disadvantages . . . Contamination by water and stabilizer occurs. Removal of volatile components is necessary. Drying and pelletizing are necessary.

⑤ Emulsion Polymerization

Advantages . . . Reaction rate is great. Removal of polymerization heat is possible. Continuous polymerization is possible. Polymer in latex can be obtained.

Disadvantages . . . Contamination by water and emulsifier occurs. Drying and pelletizing are necessary.

(B) Ion Polymerization

① Ion Polymerization

Advantages . . . Reaction rate is great. Control of polymerization heat is possible.

Disadvantages . . . Removal of solvent and catalyst powder are necessary. Refrigeration is necessary.

Among the above polymerization methods, the bulk polymerization and bulk-suspension two-step polymerization wherein styrene monomer is polymerized through radical reaction in the presence of rubber polymer are preferable in economical viewpoint, and the continuous bulk polymerization is particularly preferred. On the other hand, the suspension polymerization (in a batch form) is also preferable in view of a small amount of residual monomer, the excellence in heat resistance and the capability of a sharp turn.

A suitable melt flow index (MFI, ASTM D-1238, Condition G) of the rubber-containing aromatic monovinyl resin is 3 to 40 g/10 minutes, preferably 5 to 35 g/10 minutes, more preferably 7 to 30 g/10 minutes, the most preferably 10 to 25 g/10 minutes. The MFI of less than 3 g/10 minutes results in the frequent occurrence of short shot and weld lines due to the inferiority of resin fluidity and in the lengthening of molding cycle. On the other hand, the MFI of more than 40 g/10 minutes results in small physical strength, the frequent occurrence of burrs and the tendency to thermal degradation.

A suitable number average molecular weight of the rubber-containing aromatic monovinyl resin is 10,000 to 1,000,000, preferably 20,000 to 800,000, particularly preferably 50,000 to 600,000, in view of the balance between physical strength and polymerization cost and injection moldability.

A suitable bending elastic modulus (ASTM D-790) of the rubber-containing aromatic monovinyl resin is 20,000 $kg/cm^2$ or more, preferably 22,000 $kg/cm^2$ or more, more preferably 23,000 $kg/cm^2$ or more, the most preferably 25,000 $kg/cm^2$ or more. When the bending elastic modulus is less than 20,000 $kg/cm^2$, dimensional stability and complete light-shielding ability cannot be ensured due to the tendency to deformation by external force. Particularly, in the case of photographic film spools and photographic film cartridges (including K16 film and K35 film) used by loading into a camera, the deformation results in the difficulty in the loading into a camera, and photographing becomes impossible.

A suitable Vicat softening point (ASTM D-1525) of the rubber-containing aromatic monovinyl resin is 78° C. or more, preferably 82° C. or more, more preferably 85° C. or more, the most preferably 87° C. or more. When the Vicat softening point is less than 78° C., in the case of the molded articles colored black, they are softened to deform by leaving under the sunlight for 1 hour or more, and as a result, complete light-shielding cannot be ensured. In the case of spools, they cannot be rotated smoothly by the occurrence of deformation.

A suitable Rockwell hardness (ASTM D-785) of the rubber-containing aromatic monovinyl resin is M40 or more, preferably M45 or more, more preferably M50 or more, the most preferably M55 or more. The Rockwell hardness of less than M40 results in the occurrence of abrasion caused by the friction with metal, photographic film or the like, in the difficulty to ensure dimensional stability, and in the occurrence of spots by the adhesion of abrasion dust on a photographic photosensitive material.

A suitable Izod impact strength (ASTM D-256) of the rubber-containing aromatic monovinyl resin is 2.0 kg.cm/cm or more, preferably 2.5 kg.cm/cm or more, more preferably 3.0 kg.cm/cm or more, the most preferably 3.5 kg.cm/cm or more. When the Izod impact strength is less than 2.0 kg.cm/cm, physical strength is small. Particularly, in the case of photographic film spools, photographic film cartridges, instant film units, camera bodies and photographic film units with a lens which are frequently used under low temperature conditions of lower than 0° C., their dropping strength is insufficient.

The content of the rubber-containing aromatic monovinyl resin is 50 wt. % or more, preferably 60 wt. % or more, more preferably 70 wt. % or more, the most preferably 80 wt. % or more. When the content is less than 50 wt. %, dimensional stability cannot be ensured. Moreover, physical strength is small, and cracks and breakage occur upon dropping due to the insufficient strength. As a result, complete light-shielding ability cannot be ensured.

The decrease of physical strength becomes sharp in the temperature range of lower than 0° C. Wear resistance is also insufficient.

The light-shielding material is blended in order to ensure light-shielding, to improve printability, X-ray-shielding and heat-shielding, to render gases which adversely affect photographic photosensitive materials harmless by adsortion, to improve static electrification and physical strength of molded articles, and the like.

Representative examples of the light-shielding material are shown below.

Inorganic Compounds:

Oxides . . . silica, diatomaceous earth, alumina, titanium oxide, iron oxide (iron black), zinc oxide, magnesium oxide, antimony oxide, barium ferrite, strontium ferrite, berylium oxide, pumice, pumice balloon, alumina fiber, etc.

Hydroxides . . . aluminum hydroxides, magnesium hydroxides, basic magnesium carbonate, etc.

Carbonates . . . calcium carbonate, magnesium carbonate, dolomite, dawsonite, etc.

Sulfates, sulfites . . . calcium sulfate, barium sulfate, ammonium sulfate, calcium sulfite, etc.

Silicates . . . talc, clay, mica, asbestos, glass fiber, glass baloon, glass bead, calcium silicate, montmorillonite, bentonite, zeolite, etc.

Carbons . . . carbon black, graphite, carbon fiber, carbon hollow bead, etc.

Others . . . iron powder, copper powder, lead powder, tin powder, stainless steel powder, pearl pigment, aluminum powder, molybdenum sulfide, boron fiber, silicon carbide fiber, brass fiber, potassium titanate, lead titanate zirconate, zinc borate, barium metaborate, calcium borate, sodium borate, aluminum paste, etc.

Among the above light-shielding inorganic materials, carbon black, titanium nitride, graphite and iron oxide (iron black) which are light-absorptive light-shielding materials are excellent in light-shielding ability and opacifying power. As to the other inorganic materials, a preferred has a refraction index of not less than 1.51, greater than the refraction index of thermoplastic resin (approximately 1.4–1.5).

Preferable light-shielding materials are inorganic pigments having a refraction index measured by the Larsen oil immersion method of not less than 1.50, various metal powders, metal flakes, metal pastes, metal fibers, and carbon fiber. Representative examples are titanium oxide in rutile type (2.76), titanium oxide in anatase type (2.52), zinc oxide (2.37), antimony oxide (2.35), lead white (2.09), zinc white (2.02), lithopone (1.84), carbon black (1.61), baryta powder (1.64), barium sulfate (1.64), calcium carbonate (1.58), talc (1.58), calcium sulfate (1.56), silicic anhydride (1.55), silica powder (1.54), magnesium hydroxide (1.54), basic magnesium carbonate (1.52), alumina (1.50), and the like. The number in parenthesis indicates refraction index. Particularly preferable light-shielding materials are inorganic pigments having a refraction index of not less than 1.56, more preferably not less than 1.61.

On the other hand, since calcium silicate (1.46), diatomaseous earth (1.45), hydrous silicate (1.44) and the like have a refraction index of less than 1.50, they are unsuitable as a single material for the light-shielding material because of small light-shielding ability. In order to ensure light-shielding, a large amount of them is necessary to be blended resulting in the reduction of physical strength.

Metal powders (including metal paste) . . . aluminum powder, copper powder, stainless steel powder, iron powder, silver powder, tin powder, zinc powder, steel powder, etc.

Organic Compounds:

wood flour such as pine, oak and sawdust, husk fiber such as almond, peanut and chaff, colored various fibers such as cotton, jute, paper piece, cellophane piece, nylon fiber, polypropylene fiber, various starch (containing modified starch, surface-treated starch, etc.), aromatic polyamide fiber, etc.

Among them, carbon black is preferable because of decreasing the bleeding out of lubricant, surfactant and the like. Carbon blacks are divided into gas black, oil furnace black, channel black, anthracene black, acetylene black, Ketchen carbon black, thermal black, lamp black, vegetable black and animal black according to their origin. Among these, oil furnace carbon black is preferable in terms of light-shielding character, cost and improvement in properties. On the other hand, since acetylene black and Ketschen carbon black which is modified by-produced carbon black have an antistatic character, they are also preferable, although they are expensive. They may be blended with the oil furnace black in order to improve its character. Although, there are various blending method, such as dry coloring, liquid coloring, paste color, masterbatch pellets, compound color pellets and granular color pellets, the masterbatch method using masterbatch pellets is preferred in view of cost and less contamination of the working place. Japanese Patent KOKOKU No. 40-26196 discloses a method of making a masterbatch of polymer-carbon black by dissolving the polymer in an organic solvent and dispersing the carbon black into the solution. Japanese Patent KOKOKU No. 43-10362 discloses another method of making a masterbatch by dispersing the carbon black into polyethylene.

Particularly preferable carbon black for the molded articles for a photographic photosensitive material is the oil furnace carbon black having a pH of 4 to 9, preferably pH 5.5 to 8, a mean particle size of 10 to 120 mμ, preferably 15 to 80 mμ, a volatile component content of not more than 3.0%, preferably not more than 2.0%, a total sulfur content (ASTM D-1619) of not more than 1.0%, preferably not more than 0.5%, a cyanogen compound content of not more than 0.3%, preferably not more than 0.1%, and a DBP oil absorption value (ASTM D-2414) of not less than 50 ml/100 g, preferably more than 60 mg/100 g, in view of no occurrence of fogging, rare occurrence of photosensitivity deviation and great light-shielding ability. Moreover, when it is blended in the rubber-containing aromatic monovinyl resin, the lumps of carbon black and fish eyes rarely occur. Channel black is not preferred because of containing volatile components of more than 3.0%, of having mostly a low pH, and of frequently inducing fogging on photographic photosensitive materials, as well as of being expensive. Even when the total sulfur content is small, those containing much free sulfur which adversely affects photographic photosensitive material are not preferable. A suitable free sulfur content is not more than 150 ppm preferably not more than 50 ppm.

The blending amount of the light-shielding material is not less than 0.1 wt. %, preferably not less than 0.15 wt. %, more preferably not less than 0.2 wt. %, the most preferably not less than 0.25 wt. %, and not more than 20 wt. %, preferably not more than 15 wt. %, more preferably not more than 10 wt. %, the most preferably not more than 5 wt. %. When the blending amount is less than 0.1 wt. %, unless the thickness of a molded article is made 1 mm or more or plating, sputtering or other light-shielding coating layer is provided, complete light-shielding ability as a light-shielding molded article for photographic photosensitive material cannot be ensured. In the case of a molded article alone, the thickness is necessary to be 1 mm or more, but it is disadvantageous in view of injection moldability and cost. On the other hand, when the blending amount exceeds 20 wt. %, not only the light-shielding ability is not further improved, but also various problems occur, such as adverse affects upon photographic properties, the decrease of physical strength, the inferiority in dispersion and foaming caused by the increase of moisture absorption.

The surface of the light-shielding material can be coated with silicone oil. The silicone oil has preferably a viscosity at ordinary temperature 25° C. of 50 to 100,000 centistokes, more preferably 5,000 to 30,000 centistokes, the most preferably a high viscosity of 8,000 to 20,000 centistokes. A suitable blending amount varies according to the kind and the object of use, but is, in general, in a range of 0.01 to 8 wt. %, preferably 0.03 to 5 wt. %, particularly preferably 0.05 to 3 wt. %.

As preferable light-shielding materials, aluminum powder is next to carbon black. The aluminum powder includes aluminum paste, and preferred are the aluminum powder of which the surface is coated with a surface-coating material and aluminum paste from which low volatile components are removed and then kneaded with a thermoplastic resin. The paste of aluminum powder is produced by adding a liquid medium such as mineral spirits and a small amount of a higher fatty acid such as stearic acid or oleic acid to form a paste upon producing aluminum powder according to a known method such as using a ball mill, a stamp mill or an atomizer. The aluminum paste is kneaded together with an aromatic monovinyl resin, such as polystyrene resin or rubber-containing polystyrene resin, a polyolefin thermoplastic resin, such as various polypropylene resins, various polyethylene resins, acid-modified resins, EVA resin, EEA resin or EAA resin, low molecular weight polyolefin resin, paraffin wax, tackifier, dispersing agent, such as metallic soap, etc. with heating, and volatile components mainly mineral spirits and white spirits are removed by a vacuum pump or the like up to the low volatile component of not more than 3%, preferably not more than 1%, particularly preferably not more than 0.5%. This product is preferably used as aluminum paste compound resin or aluminum paste masterbatch resin. The aluminum paste masterbatch resin is preferable, because noxious odors and adverse influences upon the photographic photosensitive materials are eliminated. When the aluminum paste content of the molded article is made 2 wt. % by using a masterbatch resin containing 40 wt. % of aluminum paste and 1.0 wt. % of mineral spirits, one part by weight of the masterbatch resin is blended with 19 parts by weight of the dilute resin.

Since a part of the mineral spirits evaporates during molding, the final content of the mineral spirits is less than 0.05 wt. %. As a result, adverse affects upon photographic photosensitive materials do not occur, and moreover, noxious odor can be decreased. The aluminum powder includes microflakes produced from aluminum foil by crushing by a ball mill or a stamp mill, in addition to typical aluminum powder manufactured by atomization, dropping on a rotary disc or evaporation from melted aluminum. Since aluminum simplex is unstable, it is stabilized by a known surface-coating treatment which renders the surface of aluminum powder inactive.

A suitable content of the light-shielding material is 0.1 to 20 wt. % in total in order to ensure qualities as goods, photographic properties, moldability and economical view point of the molded article for photographic photosensitive materials of the invention, but it varies according to light-shielding ability. In the case of carbon black and aluminum powder which are excellent in light-shielding ability, a suitable content is 0.1 to 10 wt. %, preferably 0.15 to 7 wt. %, particularly preferably 0.2 to 5 wt. % in total. When the content is less than 0.1 wt. %, unless the thickness of the molded article is thickened, fogging occurs due to insufficient light-shielding ability. The thickening of the molded article results in the retardation of molding speed caused by lengthening cooling time, and the cost increases by the increase of resin. When the content exceeds 20 wt. %, dispersibility becomes worse to generate microgrits (lumps) which induces pressure marks and abrasion on photographic photosensitive materials. Moreover, a water content of the molded article increases by the increase of water adsorbed on carbon black, and adversely affects photographic properties, such as fogging, sensitivity deviation and abnormal coloring, upon photographic photosensitive materials. Furthermore, moldability of the molded article is degraded to induce the occurrence of foaming, silver streaks, pinholes, short shot or the like, and physical strength decreases.

It is preferably to coat the surface of a light-shielding material, such as carbon black and aluminum powder, by a surface-coating material, in order to improve the dispersibility and photographic properties, etc.

Representative surface-coating materials are as follows:

(1) Coupling agent:

Coated with a coupling agent containing azidosilane compound (disclosed in Japanese Patent KOKAI No. 62-32125).

Coated with a silane coupling agent, such as aminosilane.

Coated with a titanate coupling agent.

(2) Coated by depositing silica followed by depositing by alumina.

(3) Coated with a higher fatty acid metal salt, such as zinc stearate, magnesium stearate or calcium stearate.

(4) Coated with a surfactant, such as sodium stearate, potassium stearate or hydroxyethylene dodecylamine.

(5) Coated by reacting barium sulfide aqueous solution with sulfuric acid aqueous solution in the presence of an excess amount of barium ion to produce barium sulfate having a mean particle size of 0.1 to 2.5 μm, adding alkaline silicic acid solution thereto to deposit barium silicate on the surface of the barium sulfate, and depositing hydrous silica on the surface of the barium sulfate produced by the decomposition of the barium silicate by adding mineral acid to the slurry.

(6) Coated with a composition consisting of one or more of the oxides selected from hydrated oxides of metal, such as titanium, aluminum, cerium, zinc, iron, cobalt or silicon, and oxides of metal, such as titanium, aluminum, cerium, zinc, iron, cobalt or silicon.

(7) Coated with a polymer having one or more reactive groups selected from aziridine group, oxiazoline group and N-hydroxyalkylamide group.

(8) Coated with polyoxyalkylene amine compound.

(9) Coated with cerium cation, selected acid anion and alumina.

(10) Coated with alkoxy titanium derivative having α-hydroxycarboxylic acid residue as substituent.

(11) Coated with polytetrafluoroethylene.

(12) Coated with polydimethylsiloxane or modified silicone.

(13) Coated with phosphate ester compound.

(14) Coated with divalent to tetravalent alcohol.

(15) Coated with olefin wax, such as polyethylene wax or polypropylene wax.

(16) Coated with hydrous aluminum oxide.

(17) Coated with silica or zinc compound consisting of zinc chloride, zinc hydroxide, zinc oxide, zinc sulfate, zinc nitrate, zinc acetate or zinc citrate or a combination thereof.

(18) Coated with polyhydroxy saturated hydrocarbon, etc. Others.

A suitable coating amount is 0.001 to 5 wt. %, preferably 0.01 to 3 wt. %, particularly preferably 0.05 to 1.5 wt. %, against light-shielding material, such as carbon black or aluminum powder.

The above light-shielding material has a total sulfur content (ASTM D-1619) of not more than 1.0%, preferably not more than 0.8%, particularly preferably not more than 0.5%, a free sulfur content of not more than 150 ppm, preferably not more than 50 ppm, particularly preferably not more than 30 ppm, an ash content (ASTM D-1506) of not more than 0.5%, preferably not more than 0.4%, particularly preferably not more than 0.3%, and an aldehyde compound content of not more than 0.2%, preferably not more than 0.1%, particularly preferably not more than 0.05%, in order to avoid adverse affects upon photographic properties. Moreover, since cyanogen compounds also adversely affect photographic properties of photographic photosensitive materials, the cyanogen compound content is not more than 20 ppm, preferably not more than 10 ppm, particularly preferably not more than 5 ppm, as the value measure by the 4-pyridine carboxylic acid-pyrazolone absorption photometry to determine the amount of hydrogen cyanide, and expressed by the ratio to the weight of carbon black.

Blending effects of the silicone oil are as follows:

(1) By blending fibrous filler, non-fibrous light-shielding material or pigment, the silicone oil coats their surface to improve dispersibility.

(2) Improves resin fluidity to dicrease motor load, and prevents melt fracture.

(3) Lubricating ability can be ensured sufficiently without blending a fatty acid amide lubricant or a bis fatty acid amide lubricant which bleeds out to generate white powder.

(4) Decreases friction coefficient under heated conditions, and improves ultrasonic welding ability to obtain a fine welded portion.

(5) When a light-shielding material is combined, light-shielding ability is improved by 10% or more because of reacting with resin to opacify, and light-shielding can be ensured, even if the blending amount of light-shielding material which degrades properties decreases by 10% or more.

Suitable silicone oils are those having modified siloxane bonds, such as polydimethylsiloxane, polymethylphenylsiloxane, olefin-modified silicone, amide-modified silicone, amino-modified silicone, carboxyl-modified silicone, α-methylstyrene-modified silicone, polyether-modified silicone modified with polyethylene glycol, polypropylene glycol, etc., olefin/polyether-modified silicone, epoxy-modified silicone, alcohol-modified silicone, etc. Among them, olefin-modified silicone, carboxyl-modified silicone, amide-modified silicone, polyether-modified silicone and olefin/polyether-modified silicone are preferable. The silicone oil improves friction coefficient of molded articles, such as film, under heated conditions, decreases sliding resistance generated during hot plate sealing in an automatic packaging machine and prevents the occurrence of wrinkling. Thereby, the silicone oil provides a basis of producing a film which has beautiful appearance, high sealability, and adhesion to an article to be packaged without sagging. It prevents the degradation of gloss by sliding to form a fine sealed portion. In the case of using silicone oil, friction coefficient at high temperature can be not more than 1.4 for sliding heat seal.

In the first aspect of the molded article for a photographic photosensitive material of the invention, at least one of a lubricant and an antistatic agent is added in order to improve moldability, antistatic ability, photographic properties, slipping character, and dispersibility of the light-shielding material.

Examples of the lubricant are as follows:

Saturated fatty acid amide lubricants:

Behenic acid amide lubricants: "DIAMIDE KN" (Nippoln Kasei Chemical Co., Ltd.)

Stearic acid amide lubricants: "ARMIDE HT" (Lion), "ALFLOW S-10" (Nippon Oil and Fats Co., Ltd.), "FATTY AMIDE S" (Kao Corp.), "NEWTRON 2" (Nippon Fine Chemical Co., Ltd.), "DIAMID 200" and "DIAMIDE AP-1" (Nippon Kasei Chemical Co., Ltd.), "AMIDE S" and "AMIDE T" (Nitto Kagaku K. K.), etc.

Palmitic acid amide lubricants: "NEWTRON S-18" (Nippon Fine Chemical Co., Ltd.), "AMIDE P" (Nitto Kagaku K. K.), etc.

Lauric acid amide lubricants: "AMIDE C" (Lion Akzo Co., Ltd.), "DIAMID" (Nippon Kasei Chemical Co., Ltd.), etc.

Unsaturated fatty acid amide lubricants:

Erucic acid amide lubricants: "ALFLOW P-10" (Nippon Oil and Fats Co., Ltd.), "NEWTRON-S" (Nippon Fine Chemical Co., Ltd.), "LUBROL" (I.C.I.), "DIAMID L-200" (Nippon Kasei Chemical Co., Ltd.), etc.

Oleic amide lubricants: "ARMOSLIP-CP" (Lion Akzo Co., Ltd.), "NEWTRON" and "NEWTRON E-18" (Nippon Fine Chemical Co., Ltd.), "AMIDE-0" (Nitto Kagaku K. K.), "DIAMID O-200" and "DIAMID G-200" (Nippon Kasei Chemical Co., Ltd.), "ALFLOW E-10" (Nippon Oil and Fats Co., Ltd), "FATTY AMIDE O" (Kao Corp.), etc.

Bis fatty acid amide lubricants

Methylene bis behenic acid amide lubricants: "DIAMID NK BIS" (Nippon Kasei Chemical Co., Ltd.), etc.

Methylene bis stearic acid amide lubricants: "DIAMID 200 BIS" (Nippon Kasei Chemical Co., Ltd.), "ARMOWAX" (Lion Akzo Co., Ltd.), "BISAMIDE" (Nitto Kagaku K. K.), etc.

Methylene bis oleic acid amide lubricants: "LUBRON 0" (Nippon Kasei Chemical Co, Ltd.), etc.

Ethylene bis stearic acid amide lubricants: "ARMOSLIP EBS" (Lion Akzo Co., Ltd.), etc.

Hexamethylene bis stearic acid amide lubricants: "AMIDE 65" (Kawaken Fine Chemicals Co., Ltd.), etc.

Hexamethylene bis oleic acid amide lubricants: "AMIDE 60" (kawaken Fine Chemicals Co., Ltd.), etc.

Silicone lubricants: polydimethylsiloxanes, modified thereof, in various grades (Shin-Etsu Silicone, Toray Silicone).

Various silicone oils are preferable because of exhibiting unexpected effects, such as the improvement in the light-shielding ability caused by the improvement in dispersibility of coloring material and the improvement in coloring power by combining coloring material, as well as the improvement in resin fluidity, slipping character, etc.

Suitable silicone oils are those having a modified siloxane bond, such as polydimethylsiloxane, polymethylphenylsiloxane, olefin-modified silicone, amide-modified silicone, amino-modified silicone, carboxyl-modified silicone, α-methylstyrene-modified silicone, polyether-modified silicone modified with polyethylene glycol, polypropylene glycol, etc., olefin/polyether-modified silicone, epoxy-modified silicone, alcohol-modified silicone, etc. Among them, olefin-modified silicone, amide-modified silicone, polyether-modified silicone and olefin/polyether-modified silicone are preferable. The silicone oil improves friction coefficient of molded articles, such as films, in a heated condition, decreases sliding resistance generated during hot plate sealing in an automatic packaging machine and prevents the occurrence of wrinkling. Thereby, the silicone oil provides a basis of producing a film which has beautiful appearance, high sealability, and adhesion to an article to be packaged without sagging. It prevents the degradation of gloss by sliding to form a fine sealed portion. In the case of using silicone oil, friction coefficient at a high temperature can be not more than 1.4 for sliding heat seal.

Nonionic surfactant lubricants: "ELECTROSTRIPPER TS-2", "ELECTROSTRIPPER TS-3" (Kao Corp.), etc.

Hydrocarbon lubricants: liquid paraffin, natural paraffin, microwax, synthetic paraffin, polyethylene wax, polypropylene wax, chlorinated hydrocarbon, fluorocarbon, etc. Preferred are paraffin wax having a number of carbon atoms of 16 to 40, preferably 20 to 30 and polyethylene wax and polypropylene wax having a weight average molecular weight of 1,000 to 12,000, preferably 1,500 to 10,000, particularly preferably 2,000 to 8,000.

Fatty acid lubricants: higher fatty acids preferably more than $C_{12}$, such as caproic acid and palmitic acid, hydroxy fatty acids, etc.

Ester lubricants: fatty acid lower alcohol esters, fatty acid polyol esters, fatty acid polyglycol esters, fatty acid fatty alcohol esters, etc.

Alcohol lubricants: polyols, polyglycols, polyglycerols, etc.

Fatty acid metal salts: compounds of metal, such as Li, K, Na, Mg, Ca, Sr, Ba, Zn, Cd, Al, Sn or Pb, with a higher fatty acid, such as lauric acid, stearic acid, succinic acid, stearyl lactic acid, benzoic acid, hydroxystearic acid, lactic acid, phthalic acid, ricinoleic acid, 2 -ethylhexoic acid, naphthenic acid, oleic acid, etc. Melting point is preferably not lower than 70° C., preferably not lower than 90° C., particularly preferably not lower than 100° C.

Among the above lubricants, various saturated fatty acid amide lubricants, various unsaturated fatty acid amide lubricants and silicone lubricants are preferable for the purpose of the improvement in slipping character. Ester lubricants, fatty acid metal salts, alcohol lubricants, hydrocarbon lubricants and fatty acid lubricants are preferable for the purpose of the improvement in the dispersibility of light-shielding material, the improvement in the dispersibility and the decrease of hygroscopicity by surface coating and the improvement in resin fluidity. Among the fatty acid metal salts, calcium stearyl lactate, calcium stearate, magnesium stearate and zinc stearate are preferable because of neutralizing halogen compounds and metal compounds (including polymerization catalyst) which adversely affect photographic properties of photographic photosensitive materials to render harmless, and magnesium stearate and zinc stearate are particularly preferred.

The fatty acid metal salt and the inorganic substance having ion-exchange ability described later are blended in order to render the molded article for a photographic photosensitive material formed of the resin composition comprising 50 wt. % or more in the total amount of homopolystyrene resin, the rubber-modified polystyrene resin and various rubber-modified aromatic monovinyl resins produced by any polymerization method capable of maintaining photographic photosensitive materials with good qualities for a long time. As a result, recycling heretofore limited to specific molded articles for a photographic photosensitive material formed of a virgin resin in view of the troubles in photographic properties can be extended to every molded article formed of styrene group resin. Thereby, not only industrial wastes can be reduced, but also the local cheap resin can be used in the manufacturing factory in every country in the world. Thus, very great effects can be exhibited in the reduction of cost, the prevention of trade troubles, the pass of local contents laws.

To the resin composition, antistatic agent is added in order to prevent static marks on photographic photosensitive materials.

Antistatic agent applicable to the invention includes:

Nonionic Antistatic Agent:

Alkylamine derivatives:

Polyoxyethylene alkyl amine, tertiary amine e.g. laurylamine, N,N-bis(2-hydroxyethyl cocoamine, N-hydroxyhexadecyl-di-ethanolamine, N-hydroxyoctadecyl-di-ethanolamine, etc.

Fatty acid amide derivatives:

Oxalic acid-N,N'-distearylamide butyl ester, polyoxyethylene alkyl amide, etc.

Ethers:

Polyoxyethylene alkyl ether, polyoxyethylene alkyl phenyl ether, etc.

Polyol esters:

Glycerine fatty acid esters, sorbitan fatty acid esters, 1-hydroxyethyl-2-dodecylglyoxazoline, etc.

Anionic Antistatic Agent:

Sulfonates:

Alkyl sulfonate ($RSO_3Na$), alkylbenzene sulfonate, alkyl sulfate ($ROSO_3Na$), etc.

Phosphate esters:

Alkyl phosphate, etc.

Cationic Antistatic Agent:

Cationic amides:

Quaternary ammonium salts:

Quaternary ammonium chloride, quaternary ammonium sulfate, quaternary ammonium nitrate, e.g. stearamide propyl-dimethyl-β-hydroxyethyl ammonium nitrate, etc.

Ampholytic Antistatic Agent:

Alkyl betaines:

Imidaxolines:

Alkyl imidazolines:

Metal salts:

$(RNR'CH_2CH_2CH_2NCH_2COO)_2Mg$ {R≧C, R'=H or $(CH_2)_m$ OOO—,} etc.

Alkyl alanines:

Conductive resin:

Polyvinylbenzyl cation, polyacrylic acid cation, etc.

Among them, nonionic antistatic agents are particularly preferred, because adverse affects upon photographic properties and human body are small.

A suitable blending amount of at least one of the lubricant and the antistatic agent is 0.01 to 20 wt. %, preferably 0.02 to 15 wt. %, particularly preferably 0.05 to 10 wt. %. When the blending amount is less than 0.01 wt. %, moldability is degradated. Moreover, slipping character is inferior and troubles frequently occur in processing process. When the blending amount exceeds 20 wt. %, the effects by the excess amount are very small. Moreover, the resin composition becomes greasy, and dust tends to adhere. Resin charging time is lengthened due to screw slip and the like, and molding cycle is lengthened. In the case of silicone lubricant and fatty-acid amide lubricant which have a great lubricating effect, a suitable blending amount is 0.01 to 8 wt. %, preferably 0.03 to 5 wt. %, particularly preferably 0.05 to 3 wt. %.

In the second aspect of the molded article for a photographic photosensitive material of the invention, the inorganic substance having ion-exchange ability is added in order to adsorb gases which adversely affect photographic properties of photographic photosensitive materials to render harmless, to improve dispersibility of the light-shielding material, to react with unfavorable odor substances to render odorless. As the inorganic substance having ion-exchange ability, there are ① various zeolites including natural zeolites, such as analcime, erionite or mordenite, and synthetic zeolites in a type of A, N–A, X, Y, hydroxy sodalite, B, R, T, hyroxy cancrinite or the like, having a mean particle size of 0.1 to 7 μm, preferably 0.1 to 5 μm, particularly preferably 0.1 to 3.5 μm, and a suitable content in the resin composition being 0.1 to 10 wt. %, preferably 0.2 to 8 wt. %, particularly preferably 0.3 to 6 wt. %, and exercising various effects, such as the improvement in dispersibility, deodorization effect and adsorption of gases harmful to photographic properties, by combining light-shielding material, ② diatomaceous earth, ③ activated clay, ④ synthetic aluminum silicate, ⑤ synthetic calcium silicate, ⑥ synthetic magnesium silicate, ⑦ mica, ⑧ chelating material, etc. Examples of the chelating material are carboxylic acid-type phthalocyanine metal complex, such as metal phthalocyanine tetracarboxylic acid and metal phthalocyaine octacarboxylic acid, iminodiacetic acid-type chelate resin, aminocarboxylic acid-type chelate resin (ethylenediamine-tetraacetic acid (EDTA), etc.), polyamino-type chelate resin, glucamine-type chelate resin, carrier-type chelate resin, 4-dimethylamino-2. 6-pyridine dicarboxylic acid chelate resin, and the like. A suitable blending amount of the inorganic material having ion-exchange ability is 0.01 to 10 wt. %, preferably 0.05 to 8 wt. %, more preferably 0.1 to 6 wt. %. When the blending amount is less than 0.01 wt. %, the blending effect is insufficient. When the blending amount exceeds 10 wt. %, the effect obtained by the excess amount is small. Moreover, the derease of physical strength and the degradation of appearance occur.

In the third aspect of the molded article for a photographic photosensitive material of the invention, the rubber-containing styrene resin wherein the rubber is polybutadiene having a mean particle size of 0.1 to 7 μm is used among the rubber-containing aromatic monovinyl resins as mentioned previously. When the mean particle size is less than 0.1 μm, impact strength is decreased, and abrasion frequently occurs. On the other hand, when the mean particle size exceeds 7 μm, appearance is degraded, and tensile strength is decreased.

Carbon black is also as mentioned previously, but the mean particle size is limited to 10 to 90 mμ. When the mean particle size is less than 10 mμ, microgrits generate in quantity to induce abrasion and pressure marks on the photosensitive layer of photographic photosensitive materials. In the case of high sensitivity photographic photosensitive materials, pressure marks occur. On the other hand, when the mean particle size exceeds 90 mμ, light-shielding ability decreases resulting in the increase of the blending amount of carbon black. As a result, physical strength lowers, as well as the cost increses.

The organic polysiloxane, the fatty acid metal salt and the fatty acid amide compound are as mentioned previously concerning the lubricant.

A suitable blending amount of at least one of the organic polysiloxane, the fatty acid metal salt and the fatty acid amide compound is 0.01 to 20 wt. %, preferably 0.1 to 0.05 to 10 wt. %, more preferably to 5 wt. %. When the blending amount is less than 0.01 wt. %, the blending effect is insufficient. When the blending amount exceeds 20 wt. %, the resin composition becomes greasy, and dust tends to adhere. Resin charging time is lengthened due to screw slip and the like, and molding cycle is lengthened.

In the fourth aspect of the molded article for a photographic photosensitive material of the invention, the rubber-containing aromatic monovinyl resin is not limited by melt flow index, bending elastic modulus and Vicat softening point.

The thermoplastic resin having experienced heat histories at 150° C. or more at least twice includes aromatic monovinyl resins, rubber-containing aromatic monovinyl resins, polyolefin resins and the like. The aromatic monovinyl resins and the rubber-containing aromatic monovinyl resins are as mentioned previously.

A suitable polyolefin resin is ethylene-α-olefin copolymer (L-LDPE) resin. L-LDPE resin is called third polyethylene resin, and it is a low cost high strength resin, having the advantages of both low, medium density polyethylene resin and high density polyethylene resin, which congruent the requirements, i.e. resource conservation and energy conservation, of the times. The L-LDPE resin is a copolymer of ethylene and α-olefin, and it has a linear structure having short branches. The number of carbon atoms of the α-olefin is 3 to 13, preferably 4 to 10, and preferable α-olefins are butene-1, 4-methylpentene-1, hexene-1, heptene-1, octene-1 and decene-1, in view of polymerization properties, physical strength and cost. The density (ASTM D-1505) is usually in the degree of low, medium polyethylene resin and most of commercial resins are in the range of 0.87 to 0.95 g/cm$^3$. The melt flow index (ASTM D-1238–88, Condition E) is mostly in the range of 0.1 to 50 g/10 minutes. As the polymerization process of L-LDPE resin, there are the vapor process and the liquid slurry process using a medium, low pressure apparatus and the ion polymerization process using an apparatus for the high pressure modified method. Examples of commercial L-LDPE resin are "G-RESIN", "NUC-FLX" and "TUFLIN" (UCC)"NUC POLYETHYLENE-LL" and "TUFTHENE" (Nippon Unicar), "IDEMITSU POLYETHYLENE-L" and "MORETEC" (Idemitsu Petrochemical), "DOWLEX" (Dow Chemical), "SUCLEAR" (Dupont de Nemour, Canada), "MARLEX" (Phillips), "NEOZEX" and "ULTZEX" (Mitsui Petrochemical Industries), "NISSEKI LINIREX" (Nippon Petrochemicals), "STAMILEX" (DSM) "MITSUBISHI POLYETHY-LL" (Mitsubishi Petrochemical), and the like.

As other polyolefin resins, there are homopolyethylene resin, polybutane-1 resin, homopolypropylene resin, propylene-α-olefin copolymer resin (including propylene ethylene elastomer, propylene-ethylene-diene elastomer, etc.), ethylene copolymer resin, etc.

Suitable ethylene copolymer resins are ethylene-vinyl acetate copolymer (EVA) resin, ethylene-propylne copolymer resin, ethylene-1-butene copolymer resin, ethylene-butadiene copolymer resin, ethylene-vinyl chloride copolymer resin, ethylene-methylmethacrylate copolymer (EMMA) resin, ethylene-methyl acrylate copolymer (EMA) resin, ethylene-ethyl acrylate copolymer (EEA) resin, ethylene-acrylonitrile copolymer resin, ethylene-acrylic acid copolymer (EAA) resin, ionomer resin (copolymer of ethylene and unsaturated acid crosslinked using metal such as zinc), ethylene-α-olefin copolymer (L-LDPE) resin,-ethylene-propylene-butene-1 ternary copolymer resin, modified polyolefin resin, elastomer, and the like.

The thermoplastic resin has experienced heat histories at 150° C. or more at least twice, which improve resin fluidity and the dispersion of light-shielding material, and remove substances adversely affecting photographic photosensitive materials through thermal decomposition or evaporation to improve photographic propeties. The content of the thermoplastic resin which has experienced heat histories at 150° C. or more at least twice is 3 wt. % or more, preferably 5 wt. % or more, particularly preferably 10 wt. % or more. When the content is less than 3 wt. %, the blending effects, such as the improvement in resin fluidity, the dispersion of light-shielding material and photographic properties, are insufficient.

The resin composition forming the fourth aspect of the molded article of the invention contains at least one of the antioxidant, the deodorant, the oxygen scavenger (oxygen absorbent), the agent imparting fragrace and the inorganic substance having ion-exchange ability.

The antioxidant is added in order to prevent oxidative decomposition of resin, to prevent the decrease of physical strength, to prevent the production of decomposed products adversely affecting photographic properties of photographic photosensitive materials, such as alcohols, aldehydes, ketones and carboxylic acids, to prevent the generation of black lumps (agglomerates of foreign material) and coloring troubles caused by resin yellowing.

Examples of the antioxidant are as follows:

Phenolic Antioxidants:

vitamin E (α-tocopherol, 6-t-butyl-3-methylphenol derivatives, 2,6-di-t-butyl-phenol, 2,6-di-t-butyl-p-ethylphenol, 2,6-di-t-butyl-p-cresol (BHT), 2,2'-methylenebis-(4-ethyl-6-t-butylphenol), 2,2-methylenebis-(4-methyl-6-t-butylphenol), 4,4'-butylidenebis(6-t-butyl-m-cresol), 4,4'-thiobis(6-t-butyl-m-cresol), 4,4-dihydroxydiphenylcyclohexane, alkyl group-induced bisphenol, styrene group-induced phenol, 2,6-di-t-butyl 4-methylphenol, n-octadecyl-3-(3',5'-di-t-butyl- 4'-hydroxyphenyl )propionate, 2,2,'-methylenebis(4 -methyl-6-t-butylphenol), 4,4'-butylidenebis(3-methyl-6 -t-butylphenol), stearyl-β-(3,5-di-4-butyl-4-hydroxyphenyl)propionate, 1,1,3-tris(2-methyl-4 -hydroxy-5-t-butylphenyl)butane, 1,3,5-trimethyl-2,4,6-tris(3,5-di-t-butyl-4-hydroxybenzyl)benzene, tetrakis [methylene-3-(3',5'-di-t-butyl-4'-hydroxyphenyl) propionate]methane, etc.

Ketone-Amine Condensate Antioxidants:

6-ethoxy-2,2,4-trimethyl-1,2-dihydroquinoline, polymers of 2,2,4-trimethyl-1,2-dihydroquinoline, trimethyldihydroquinoline derivatives, etc.

Arylamine Antioxidants:

Phenyl-α-naphthylamine, N-phenyl-β-naphthylamine, N-phenyl-N'-isopropyl-p-phenylenediamine, N,N'-diphenyl-p-phenylenediamine, N,N'-di-β-naphthyl-pphenylenediamine, N-(3'-hydroxybutylidene)-1-naphthylamine, etc.

Imidazole Antioxidants:

2-mercaptobenzomidazole, zinc salt of 2-mercaptobenzomidazole, 2-mercaptomethylbenzoimidazole, etc.

Phosphite Antioxidants:

Alkyl-induced arylphosphite, diphenylisodecylphosphite, sodium phosphite salt of tris(nonylphenyl)phosphite, trinonylphenylphosphite, triphenylphosphite, etc.

Thiourea Antioxidants:

Thiourea derivatives, 1,3-bis(dimethylaminopropyl)-2 -thiourea, etc.

Other Antioxidants:

Those useful for air oxidation, such as dilauryl thiodipropionate, metal deactivators, etc.

Preferable antioxidants are phenolic antioxidants, and particularly effective antioxidants are BHT, low volatile high molecular weight penolic antioxidants ("Irganox 1010", "Irganox 1076", trade names of Ciba-Geigy A. G., "Ionox 330", trade name of Shell, "Good-Rite 3114" trade name of Goodrich, "Topanol CA", trade name of I.C.I., etc.), dilaurylthiodipropionate, distearylthiodipropionate, dialkylphosphate, etc. Two or more antioxidants may be combined.

Furthermore, oxidation inhibition is synergistically exercised by combining carbon black or the like, and particularly exercised by combining a phenolic antioxidant, a phosphorus-containing antioxidant and carbon black.

Particularly preferable antioxidants are hindered phenolic antioxidants because of rare adverse affect upon photographic properties of photographic photosensitive materials. The hindered phenolic antioxidants are 1,3,5 -trimethyl-2,4,6-tris(3,5-di-tert-butyl-4-hydroxybenzyl) benzene, tetrakis [methylene(3,5-di-tert-butyl-4-hydoxy-hydrocinnamate)-methane], octadecyl-3,5-di-tert-butyl-4-hydroxy-hydrocinnamate, 2,2',2'-tris (3,5-di-tert-butyl-4 -hydroxyphenyl)propionyloxy ethylisocyanulate, 1,3,5-tris(4-tert-butyl-3-hydroxy-2,6-di-methylbenzyl) isocyanulate, tetrakis(2,4-di-tert-butylphenyl)-4,4'-biphenylene diphosphite ester, tetrakis[methylene-3-(3,5-di-tert-butyl- 4-hydroxyphenyl)-propionate]methane, 4,4'-triobis-(6-tert-butyl-o-cresol), 2,2'-thiobis-(6-tert-butyl-4-methylphenol), tris-(2-methyl-4-hydroxy-5-tert-btuylphenyl)butane, 2,2'-methylene-bis-(4-methyl -6-tert-butylphenol), 4,4'-methylene-bis-(2,6-di-tert-butylphenol), 4,4'-butylidenebis-(3-methyl-6-tert-butylphenol), 2,6-di-tert-butyl-4-methylphenol, 4-hydroxymethyl-2,6 -di-tert-butylphenol, 2,6-di-tert-4-n-butylphenol, 2,6-bis(2'-hydroxy-3'-tert-butyl-5'-methylbenzyl)-4 -methylphenol, 4,4'-methylene -bis-(6-tert-butyl-o-cresol), 4,4'-butylidene-bis-(6-tert-butyl-m-cresol, and the like. According to the properties of antioxidants, two or more kinds of antioxidants may be combined. Preferable antioxidants have a melting point of more than 100° C., particularly preferably more than 120° C., in view of small bleeding out, small thermal decomposition, and small adverse affect upon photographic photosensitive materials.

Besides, other antioxidants usable in the invention can be selected from those disclosed in "Plastic Data Handbook" (published by Kyogyo Chosa Kai), pages 794–799, "Plastic Additives Data Collection" (published by Kagaku Kogyo), pages 327–329, "Plastic Age Encyclopedia, Advance Editions 1986" (published by Plastic Age), pages 211–212, etc.

Oxidative degradation does not occur so much in the rubber-containing aromatic monovinyl resin and in general, tends to occur in the polyolefin resin having more $CH_3$ branches due to a greater oxygen absorption. Accordingly, oxidative degradation occurs in the order of more:

polypropylene resin>homopolyethylene resin>ethylene-α-olefin copolymer resin: less.

Various polyethylene resins (containing ethylene-α-olefin copolymer resins) and various polypropylene resins (containing propylene-ethylene random copolymer resins) which are representative crystalline thermoplastic resins are hydrocarbons, and it is considered that when a radical group is produced through dehydration of hydrocarbon in the presence of oxygen, antioxidation proceeds in the following formulas as chain reaction.

RH→R.

R.+$O_2$→ROO.

ROO.+RH→ROOH+R.

ROOH→RO.+. OH

RO.+RH→ROH+R.

.OH+RH→HOH+R.

Thus, the oxidation of hydrocarbon is accelerated to produce a great quantity of alcohols, aldehydes, acids and the like, and they react with each other to produce polymer. In order to prevent oxidation of hydrocarbon, it is necessary to intercept the above chain reaction, and antioxidant is used for that purpose. Besides, it is also preferable to add the following radical scavenger.

As the radical scavenger suitable for the invention, there are 1,1-diphenyl-2-picrylhydrazyl, 1.3.5-triphenylferudazyl, 2.2,6.6-tetramethyl-4-piperidone-1-oxyl, N-(3-N-oxyanilino- 1 3-dimethylbytylidene)anilinoxide, high valency metal salts, such as ferric chloride, diphenylpicrylhydrazine, diphenyamine, hydroquinone, t-butylcatechol, dithiobenzyldisulfide, p.p'-ditolyltrisulfide, benzoquinone derivatives, nitro compounds, nitroso compounds, and the like. Among them, to use hydroquinone is particularly preferred. The above radical scavenger may be used as a single material, or several kinds may be combined. A suitable content of the radical scavenger is 1,000 to 10,000 ppm, preferably 2,000 to 9,000 ppm, particularly preferably 3,000 to 8,000 ppm.

As the antioxidant, there are radical group chain terminator which reacts with radical groups, mainly ROO., which are chain carriers, to inactivate them, and peroxide decomposer which decomposes hydroperoxide ROOH which is the main source of radical groups, to stabilize it. The radical group chain terminator includes phenolic antioxidant and aromatic amine antioxidant. The peroxide decomposer includes sulfur-containing antioxidant and phosphorus-containing antioxidant. It is preferable to combine one or more of the antioxidant of the radical group chain terminator and one or more of the antioxidant of the peroxide decomposer, in order to prevent the thermal degradation of the rubber-containing aromatic monovinyl resin. Since antioxidant is a reducing agent which adversely affects photographic photosensitive materials, unless its kind and the blending amount is carefully examined, the degradation of photographic photosensitive materials becomes a great problem.

In the invention, it is preferable to add an age resistor which prevents the degradation of the rubber-containing aromatic vinyl resin, similar to the antioxidant and the radical scavenger. Representative age resistors are naphthylamines such as phenyl-β-naphthylamine, diphenylamines such as N,N'-diphenylethylenediamine, p-phenylenediamines such as N,N'-diphenyl-p-phenylenediamine, hydroquinone derivatives such as 6-ethoxy-2,2,4-trimethyl- 1,2-dihydroquinoline, monophenols such as 2,6-di-tert-butyl-4-methylphenol, polyphenols such as 2,2'-methylene-bis (4 -ethyl-6-t-butylphenol, thiobisphenols such as 4,4'-thiobis-(6-t-butyl-3-methylphenol), 2-mercaptobenzoimidazole and the like. They are optionally blended according to their characteristics. A suitable blending amount is 0.01 to 10 parts by weight, preferably 0.05 to 5 parts by weight, particularly preferably 0.1 to 3 parts by weight, per 100 parts by weight of the rubber-containing aromatic vinyl resin. The blending amount of less than 0.01 part by weight results in insufficient blending effects on the prevention of aging, and on the other hand, the blending amount of more than 10 parts by weight results in the occurrence of vulcanization troubles and remarkable blooming. Two or more age resistors may be combined, and thereby, it is possible to improve the effect upon the prevention of aging.

It is also preferable to add an ultraviolet stabilizer which prevents the degradation of the rubber-containing aromatic vinyl resin, similar to the antioxidant, the radical scavenger, and the age resistor. Representative ultraviolet stabilizer are salicylate ultraviolet stabilizers, such as phenylsalicylate, p-t-butylphenylsalicylate and p-octylphenylicylate, benzophenone ultraviolet stabilizers, such as 2,4-dihydroxybenzophenone, 2-hydroxy-4-methoxybenzophenone, 2-hydroxy-4-octoxybenzophenone, 2-hydroxy-4 -dodecyloxybenzophenone, 2,2'-dihydroxy-4-methoxybenzophenone, 2,2'-dihydoxy -4,4'-dimethoxybenzophenone and 2-hydroxy-4-methoxy-5 -sulfobenzophenone, benzotriazole ultraviolet stabilizers, such as 2-(2'-hydroxy-5'-methylphenyl)benzotriazole, 2-(2'-hydroxy-5'-t-butylphenyl-)benzotriazole, 2-(2'-hydroxy-5'-di-t-butylphenyl)benzotriazole, 2-(2'-hydroxy-3',5' -di-t-butylphenylbenzotriazole, 2-(2'-hydroxy-3'-t-butyl-5'-methylphenyl)-5-chlorobenzotriazole, 2-(2'-hydroxy-3',5'-di-t-butylphenyl)-5 -chlorobenzotriazole, 2-(2'-hydroxy-3',5'-di-t-amylphenyl)benzotriazole, 2-(2'-hydroxy-4'-octoxyphenyl)benzotriazole, 2-[2'-hydroxy-3'-(3",4",5",6"-tetrahydro-phthal imidemethyl)-5'-methylphenyl]-benzotriazole and 2,2 -methylene-bis[4-(1,1,3,3-tetramethylbutyl)-6-(2 H-benzotriazole-2-il)phenol], and cyanoacrylate ultraviolet stabilizers, such as 2-ethylhexyl-2-cyano-3,3'-di-phenylacrylate and ethyl-2-cyano-3,3'-diphenylate, and the like. A suitable blending amount is 0.01 to 10 parts by weight, preferably 0.05 to 5 parts by weight, particularly preferably 0.1 to 3 parts by weight, per 100 parts by weight of the rubber-containing aromatic vinyl resin. The blending amount of less than 0.01 part by weight results in insufficient effects on ultraviolet stabilization, and on the other hand, the blending amount of more than 10 parts by weight results in the occurrence of bleeding out which adversely affects photographic properties of photographic photosensitive materials. Two or more ultraviolet stabilizers may be combined.

It is preferable to add a hydrous double salt because of exercising almost similar effects to the aforementioned degradation preventing agents such as the antioxidant. Representative preferable hydrous double salts are hydrotalcite compounds having the following general formula;

$$MxRy(OH)_{2x+3y-2z}(A)_z.aH_2O$$

(M is Mg, Ca, or Zn, R is Al, Cr or Fe, A is $CO_3$ or $HPO_4$, x, y, z and a is a positive number)

Particularly preferred are $Mg_6Al_2(OH)_{16}CO_3.4H_2O$, $Mg_3Al_2(OH)_{20}CO_3.5H_2O$, $Ca_6Al_2(OH)_{16}CO_3.4H_2O$, $Mg_3Al_2(OH)_{14}CO_3.4H_2O$, $Mg_{10}Al_2(OH)_{22}(CO_3)_2.4H_2O$, $Mg_6Al_2(OH)_{16}HPO_4.4H_2O$, $Ca_6Al_2(OH)_{16}CO_3.4H_2O$, $Zn_6Al_2(OH)_{16}CO_3.4H_2O$, $Mg_{4.5}Al_2(OH)_{13}CO_33.5H_2O$, and the like. Other suitable hydrotalcite compounds are represented by the following formula;

$$M_{(1-x)}.Al_x.(OH)_2.X_{x/n}.mH_2O$$

(M is an alkaline earth metal or Zn, X is an anion with valence of n, and x and m satisfy the conditions of $0<x<0.5$ and $0\leqq m\leqq 2$)

and have a refractive index of 1.40 to 1.60, preferably 1.45 to 1.55. Examples of the above anion with a valence of n are $Cl^-$, $Br^-$, $I^-$, $NO_3^-$, $ClO_4^-$, $SO_4^{2-}$, $CO_3^{2-}$, $SiO_3^{2-}$, $HPO_4^{2-}$, $HBO_3^{2-}$, $PO_4^{2-}$, $Fe(CN)_6^{3-}$, $Fe(CN)_4^{4-}$, $CH_3COO^-$, $C_6H_4(OH)COO^-$ 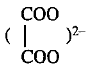 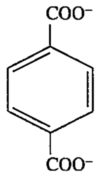

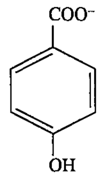 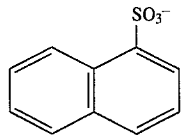

and the like. Still other suitable hydrotalcite compounds are composed of magnesium and aluminum represented by the following formula;

$$Mg_{1-x}Al_x(OH)_2A_{x/2}.mH_2O$$

(X is a real number in the range of $0<X\leqq 0.7$, A is $CO_3$, and m is a real number)

Preferable examples are $Mg_{0.7}Al_{0.3}(OH)_2(CO_3)_{0.15}\cdot 0.54H_2O$, $Mg_{0.67}Al_{0.33}(OH)_2(CO_3)_{0.165}\cdot 0.5H_2O$, $Mg_{0.67}Al_{0.33}(OH)_2(CO_3)_{0.165}\cdot 0.2H_2O$, $Mg_{0.6}Al_{0.4}(OH)_2(CO_3)_{0.2}\cdot 0.42H_2O$, $Mg_{0.75}Al_{0.25}(OH)_2(CO_3)_{0.125}\cdot 0.63H_2)$, $Mg_{0.33}Al_{0.17}(OH)_2(CO_3)_{0.085}\cdot 0.4H_2O$ and the like. The above hydrous double salt may be natural material or synthetic material. Syntheses of the hydrotalcite are disclosed in Japanese Patent KOKOKU Nos. 46-2280 and 50-30039, which are applicable to the invention. In the invention, hydrotalcite compounds are particularly preferable, and are not particularly limited to their crystal structure, or particle size. As the natural hydrotalcite, there are hydrotalcite, stichtite, pyroaurite, and the like. The hydrous double salt may be used as a single material, or two or more kinds may be blended. It is preferable to combine with various antioxidant or various fatty acid metal salt described later. A suitable blending amount of the hydrous double salt in the resin composition is 0.001 to 5 wt. %, preferably 0.005 to 3.5 wt. %, more preferably 0.01 to 2 wt. %, the most preferably 0.05 to 1 wt. %. When the blending amount is less than 0.001 wt. %, anticorrosion through production and processing is insufficient, and coloring or degradation of resin occurs in the molded articles. When the blending amount exceeds 5 wt. %, lumps generate in the molded articles and gloss decreases to degrade appearance. Although the particle size of the hydrous double salt is not particularly limited, it is preferable to have a mean secondary particle size of not more than 20 μm, preferably not more than 10 μm, particularly preferably not more than 5 μm, and a BET specific surface area of not more than 50 $m^2/g$, preferably not more than 40 $m^2/g$, particularly preferably not more than 30 $m^2/g$, in order to improve processibility of injection molded articles, properties and the like.

In the invention, the hydrotalcite compounds are preferably treated with a surface-treating agent prior to use. By treating with the surface-treating agent, dispersibility and affinity are further improved, and processibility of injection molded articles, properties and the like are also improved. As the examples of the surface-treating agent, there are higher fatty acid metal salts, such as sodium laurate, calcium laurate, sodium oleate, potassium oleate, calcium oleate, magnesium stearate, sodium stearate, zinc stearate, potassium stearate, sodium palmitate, potassium palmitate, sodium caprate, potassium caprate, sodium myristate, potassium myristate, sodium linolate and potassium linolate, higher fatty acids, such as lauric acid, palmitic acid, oleic acid, stearic acid, capric acid, myristic acid and linolic acid, organic sulfonic acid metal salts, such as calcium dodecylbenzenesulfonate and sodium dodecylbenzenesulfonate, coupling agents, such as isopropyltriisostearoyl titanate, isopropyltris(dioctylpyrophosphate)titanate, tetraisopropylbis(dioctylphosphite)titanate, vinyltriethoxysilane, γ-methacryloxypropyltrimethoxysilane and γ-glycidoxypropyltrimethoxysilane, various lubricants, such as higher fatty acid amides, higher fatty acid esters, silicones and waxes, and the like.

Surface treatment with the above surface-treating agent can be conducted by adding an aqueous higher fatty acid alkali metal salt solution to hydrotalcite suspended into hot water with stirring or by dropping a fused higher fatty acid or dilute coupling agent solution to hydrotalcite powder stirred by a mixer such as a Henschel mixer. A suitable amount of the surface-treating agent is about 0.01 to 50 wt. %, preferably about 0.05 to 35 wt. %, more preferably about 0.1 to 20 wt. %, the most preferably about 0.5 to 10 wt. %, of the hydrotalcite compound.

The hydrous double salt may contain a small amount of impurities, such as other metal oxides to the degree substantially not affecting the effects of the invention.

In order to improve the dispersion of hydrotalcite compound, a sorbitan fatty acid ester such as sorbitan monostearate or a glycerine fatty acid ester such as glycerine monostearate may be added to the resin composition as dispersing agent in an amount of 0.01 to 10 wt. %, preferably 0.05 to 8 wt. %, more preferably 0.08 to 5 wt. %, the most preferably 0.1 to 3 wt. %. By combining with the hydrous double salt compound, processing stability and anticorrosion are improved.

It is particularly preferable to combine at least one stabilizer selected from the group consisting of phenolic antioxidants, phosphorus-containing (phosphite) antioxidants and fatty acid metal salts, which prevent coloring and resin degradation of the molded article, improve transparency, prevent the degradation of physical strength and improve synergistically the function of preventing the generation of lumps caused by resin yellowing. In this case, in order to avoid adverse affects upon photographic properties of a photographic photosensitive material and to reduce cost, it is preferably to add a minimum amount capable of preventing resin degradation, for example;

(a) a phenolic antioxidant is added in an amount of 0.0005 to 5 wt. %, preferably 0.001 to 3 wt. %, particularly preferably 0.002 to 1 wt. %, (b) a phosphorus-containing antioxidant is added in an amount of 0.0005 to 5 wt. %, preferably 0.001 to 3 wt. %, particularly preferably 0.002 to 1 wt. %, (c) a hydrous double salt compound and/or a fatty acid metal salt (metallic soap) are added in an amount of 0.0005 to 10 wt. %, preferably 0.001 to 5 wt. %, particularly preferably 0.002 to 3 wt. %, and the sum of (a), (b) and (c) is 0.0015 to 20 wt. %, preferably 0.002 to 10 wt. %, more preferably 0.003 to 7 wt. %, the most preferably 0.005 to 5 wt. % of the molded article for a photographic photosensitive material.

As the deodorant, there are organic carboxylic acids, mixtures of organic carboxylic acid and zinc compound, mixtures of organic carboxylic acid, zinc compound and aluminum compound, etc.

The organic carboxylic acids include aliphatic polycarboxylic acids, aromatic polycarboxylic acids, acidic polyester compounds which are a reaction product of the aliphatic or aromatic polycarboxylic acid and polyol compound and has a carboxyl group at terminal(s), etc. As the aliphatic polycarboxylic acids, there are various di- or tri-carboxylic acids, such as oxalic acid, malonic acid, succinic acid, adipic acid, fumaric acid, methylfumaric acid, maleic acid, methylmaleic acid, itaconic acid, acetylenic acid, malic acid, methylmalic acid, citric acid, isocitric acid, mesaconic acid, citraconic acid and their salts, and the like, and citric acid and fumaric acid and their salts are particularly preferred. As the aromatic polycarboxylic acids, there are phthalic acid, terephthalic acid, isophthalic acid, trimellitic acid pyromellitic acid, benzenehexatricarboxylic acid, naphthalene dicarboxylic acid, naphthalene tricarboxylic acid, naphthalene tetracarboxylic acid, azobenzene tetracarboxylic acid, and their anhydrides and the like, and benzene tricarboxylic acid and trimellitic acid are particularly preferred. As the acidic polyester compound having a carboxylic group at a terminal, there are polyesters having a terminal carboxyl group produced by the reaction of polycarboxylic acid such as phthalic acid with polyol such as ethylene glycol or diethylene glycol, acidic cellulose derivatives modified with polycarboxylic acid, and the like.

The zinc compound combined with the organic carboxylic acid includes zinc oxide, inorganic zinc salts, such as zinc chloride, zinc sulfate, zinc phosphate and zinc carbonate, and organic zinc salts, such as zinc citrate and zinc fumarate. A suitable mixing ratio of organic carboxylic acid: zinc compound is 1:0.1–3 by weight ratio.

The aluminum compound combined with the organic carboxylic acid and the zinc compound includes aluminum sulfate and potassium alum, and a suitable mixing ratio of organic carboxylic acid:zinc compound:aluminum compound is 1:0.1:0.1 to 1:3:3 by weight ratio.

A suitable content of the deodrant is 0.01 to 20 wt. %, preferably 0.05 to 15 wt. %, particularly preferably 0.1 to 10 wt. %. When the content is less than 0.01 wt. %, the blending effect is insufficient. On the other hand, when the content exceeds 20 wt. %, dispersibility becomes worse to generate microgrits.

As the oxygen scavenger, there are sulfites, hydrogen sulfites, dithionates, hydroquinone, catechol, resorcin, pyrogallol, gallate, ascorbic acid, ascorbate, isoascorbic acid, isoascorbate, glucose, lignin, dibutylhydroxytoluene, butyldroxyanisole, ferrous salts, metal powders such as iron powder, carbon dioxide-generating type oxygen scavengers, carbon dioxide-absorbing type oxygen scavengers, cristobalite, zeolite, hydrosulfite, glucose oxidase, sarcosine, alkali metal sulfides, alkali carbonates, sodium thiosulfate, sodium alum, disodium hydrogen phosphate.12 hydrates, hydrous sodium silicate, hydrous sodium borate, ferrous silicate sulfate.7 hydrates, activated clay, mordenite, and the like. The oxygen scavenger may be used as a single material or a combination of them. Preferable oxygen scavengers are those containing hydrosulfite as the principal component, those containing organic material such as L-ascorbic acid as the principal component, those containing iron powder as the principal component, mixture compositions of iron and at least one material selected from the group consisting of ferrous silicate sulfate.7 hydrates, activated clay, mordenite, and the like. The oxygen scavenger may be used as a single material or a combination of them. Preferable oxygen scavengers are those containing hydrosulfite as the principal component, those containing organic material such as L-ascorbic acid as the principal component, those containing iron powder as the principal component, mixture compositions of iron and at least one material selected from the group consisting of ferrous silicate sulfate.7 hydrate, sodium alum, dissodium hydrogen phosphate.7 hydrate, sodium alum, disodium hydrogen phosphate.12 hydrates, hydrous sodium silicate and hydrous sodium borate, hydrosulfite and calcium hydroxide or sodium bicarbonate and activated carbon, iron powder, accelerating salt and hydrous material, oxidizable metal powder and sodium thiosulfate and solid reaction assistant, iron powder and sodium thiosulfate and activated carbon, activated iron oxide, metal oxides, palladium, sugars, enzymes, and the like.

A suitable content of the deodorant is 0.01 to 20 wt. %, preferably 0.05 to 15 wt. %, particularly preferably 0.1 to 10 wt. %. When the content is less than 0.01 wt. %, the blending effect is insufficient. On the other hand, when the content exceeds 20 wt. %, dispersibility becomes worse to generate microgrits.

The agent imparting fragrance are natural fragrant components, such as ethereal oil of lilac flower, jasmin, abies oil, cinnamon oil, lavender oil and lemon oil, and synthetic fragrant components, such as geraniol, eugenol, n-octyl alcohol, carbitol, cis-jasmone, lemon terpene, methone, methylsalicylate, methylphenylcabinol, triethyl citrate, benzyl benzolate, citral, d-limonene, ethylcinnamate, alkylene glycol, benzylsalicylate, linalool, varillin, coumarin, methyl naphthyl ketone and rose phenon, which are used by encapsulating to form microcapsules or entrapping by cyclodextrin, maltosyl cyclodextrin, zeolite, starch, talc or the like.

The inorganic substance having ion-exchange ability is as mentioned previously.

One or more of the antioxidant, the deodorant, the agent imparting fragrance, the oxygen scavenger or the inorganic material having ion-exchange ability are contained in the resin composition, and the content is 0.01 to 20 wt. %, preferably 0.05 to 15 wt. %, more preferably 0.1 to 10 wt. %. When the content is less than 0.01 wt. %, the blending effect is insufficient. On the other hand, when the content exceeds 20 wt. %, the effect exercised by the excess amount is very small. According to their kind, photographic properties of photographic photosensitive materials are adversely affected, or physical strength of the molded article is decreased, or the like.

Among the rubber-containing aromatic monovinyl resins, particularly in the case of polybutadiene-containing styrene resin or polybutadiene-containing ABS resin which contain 0.5–20 wt. %, preferably 1 to 12 wt. % of polybutadiene rubber having a mean particle size of 0.1 to 10 μm, it is preferable to blend 0.001 to 3 wt. %, preferably 0.005 to 2 wt. %, particularly preferably 0.01 to 1 wt. %, of the phosphorus-containing antioxidant composed of the organic cyclic phosphorus compound represented by the following general formula as a single material or in combination with 0.001 to 3 wt. %, preferably 0.005 to 2 wt. %, particularly preferably 0.01 to 1 wt. % of one or more of the aforementioned phenolic antioxidant and/or phosphorus-containing antioxidant. By the blending, yellowing or browning of the rubber-containing aromatic monovinyl resin can be prevented even retarded in a cylinder at a high temperature during injection molding for a long time, and the generation of lumps (agglomerates of foreign material) caused by insufficient heat stability can be prevented. Moreover, the inhibition of coloring and the inhibition of lump generation are synergistically improved by conbining a substance exercising synergistic effect, such as phosphoric acid and citric acid.

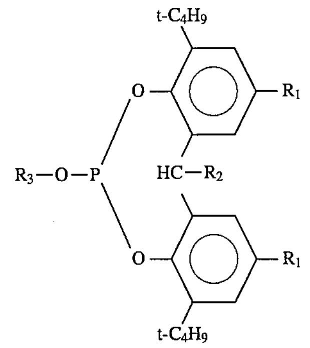

In the formula, $R_1$ represents an alkyl group having a number of carbon atoms of 1–9, $R_2$ represents an alkyl group having a number of carbon atoms of 1–4, and $R_3$ represents an alkyl group having a number of carbon atoms of 1–30.

The alkyl group of $R_1$ is methyl, ethyl, propyl, isopropyl, butyl, amyl, hexyl, octyl, nonyl or the like, and the alkyl group of $R_2$ is methyl, ethyl, propyl, isopropyl, butyl, sec-butyl, isobutyl or the like. The alkyl group of $R_3$ is methyl, ethyl, propyl, isopropyl, butyl, amyl, hexyl, heptyl, octyl, nonyl, decyl, dodecyl, octadecyl or the like.

As the phenolic antioxidant composed of a phenol compound exercising a great effect to prevent coloring troubles and lump generation to render continuous injection molding for a long period possible by the combination with the phosphorus-containing antioxidant composed of the organic cyclic phosphorus compound, there are the compound represented by the following formula.

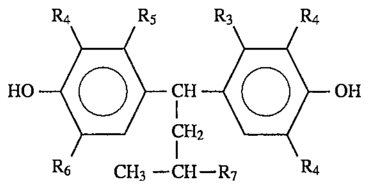

In the formula, $R_3$ represents an alkyl group having a number of carbon atoms of 1–30, $R_4$–$R_6$ represent independently hydrogen atom, an alkyl group having a number of carbon atoms of 1–18, an aryl group or a cycloalkyl group, and $R_7$ represents hydrogen atom, an alkyl group, an aryl group or an arylalkyl group.

As the phosphorus-containing antioxidant, there are the following triaryl phosphorus compound.

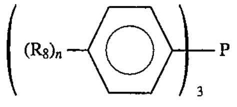

In the formula, $R_8$ represents hydrogen atom, an alkyl group having a number of carbon atoms of 1–18, an aryl group or a cycloalkyl group n is 1–3, and when n is 2 or 3, $R_8$ may be identical with or different from each other.

A plasticizer may be blended into the above four aspects of the molded article for a photographic photosensitive material in order to improve uniform dispersibility of the light-shielding material.

(1) Phthalic acid plasticizer dibutyl phthalate, diheptyl phthalate, dioctyl phthalate, diisodecyl phthalate, butyl lauryl phthalate, ditridecyl phthalate, butyl benzyl phthalate, butyl phthalyl buryl glycolate, etc.

(2) Phosphoric acid plasticizer tricresyl phosphate, trioctyl phosphate, etc. (

3) Fatty acid plasticizer tri-n-butyl citrate, dioctyl adpate, dioctyl azelate, dioctyl sebacate, methyl acetyl ricinoleate, etc.

(4) Epoxy plasticizer alkyl epoxy stearate, 4,5-epoxytetrahydrodiisodecyl phthalate, etc.

(5) Other plasticizer chlorinated paraffin, polyester, sucrose octacetate, etc.

A suitable blending amount of the plasticizer is 0.01 to 10 wt. %, preferably 0.05 to 7 wt. %, particularly preferably 0.1 to 5 wt. %. When the blending amount is less than 0.01 wt. %, the blending effects of the improvement in the uniform dispersibility of light-shielding material and in the blocking adhesion is insufficient. When the blending amount exceeds 10 wt. %, screw slip occurs in an extruder resluring in the variation of ejected resin amount.

It is preferable to blend dripproofing agent in order to prevent adhesion of dew onto the molded article for a photographic photosensitive material. The dripproofing agent includes diglycerine monostearate ester, polyglycerine monopalmitate ester, sorbitan monolaurate ester, sorbitan monoerucate, polyoxyethylene sorbitan fatty acid ester, stearic acid monoglyceride, polyoxyethylene nonylphenyl ether, sorbitan sesquipalmitate, diglycerine sesquioleate, sorbitol fatty acid ester, sorbitol fatty acid dibasic acid ester, diglycerine fatty acid dibasic acid ester, glycerine fatty acid dibasic acid ester, sorbitan fatty acid dibasic acid ester, sorbitan palmitate, sorbitan stearate, sorbitan palmitate propylene oxide 3 moles adduct, sorbitan palmitate propylene oxide 2 moles adduct, sorbitol stearate, sorbitol stearate ethylene oxide 3 moles adduct, diglycerine palmitate, glycerine palmitate, glycerine palmitate ethylene oxide 2 moles adduct, etc.

A suitable blending amount of the dripproofing agent is 0.01 to 5 wt. %, preferably 0.1 to 3 wt. %, particularly preferably 0.3 to 2 wt. %. When the blending amount is less than 0.01 wt. %, the blending effect is insufficient. When the blending amount exceeds 5 wt. %, the effect increased by increasing the blending amount is little. According to the kind of dripproofing agent, screw slip of thermoplastic resin increases to vary ejected resin amount. Bleeding out onto the surface of the molded article with time increases resulting in the degradation of quality, such as greasiness and adhesion of dust.

An organic nucleating agent can be added to the molded article for a photographic photosensitive material in order to improve crystallization rate, rigidity, physical strength or the like.

The organic nucleating agent includes carboxilic acids, dicarboxylic acids, their salts and anhydrides, salts and esters of aromatic sulfonic acids, aromatic phosphinic acids, aromatic phosphonic acids, aromatic carboxylic acids and their aluminum salts, metal salts of aromatic phosphoric acids, alkyl alcohols having a number of carbon atoms of 8 to 30, condensation products of a polyhydric alcohol and an aldehyde, and alkylamines. Examples are aluminum p-t-butylbenzoate, 1,3-benzylidenesorbitol, 1.3,2.4-dibenzylidenesorbitol, the di-substituted benzylidenesorbitol represented by the following formula;

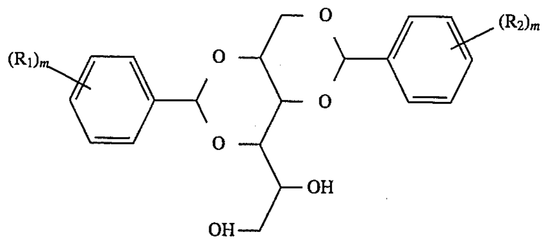

In the formula, $R_1$ and $R_2$ indicate an alkyl group or an alkoxy group having a number of carbon atoms of 1 to 8 or a halogen, and m and n are 0 to 3 and m+n≧1.

metal salts, such as calcium salt and magnesium salt, of stearyl lactic acid, the compounds, such as N-(2-hydroxyethyl)-stearylamine, represented by the following formula;

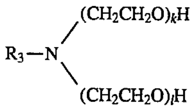

In the formula, $R_3$ indicates an alkyl group having a number of carbon atoms of 8 to 30, and k and l are 0 to 10 and k+l≧1.

metal salts, such as lithium salt, sodium salt, potassium salt, calcium salt and magnesium salt, of 1,2-dihydroxystearic acid, stearyl alcohol, lauryl alcohol, sodium benzoate, benzoic acid, and sebacic acid.

Among the organic nucleating agent, sorbitol compounds are excellent in a great crystallization-accelerating effect, rare adverse affect on photographic properties, the decrease of molding troubles, the shortening of molding cycle and the improvement in rigidity and in appearance.

Examples of the sorbitol compound are as follows:

di-(o-methylbenzylidene)sorbitol o-methylbenzylidene-p-methylbenzylidene sorbitol di-(m-methylbenzylidene)sorbitol m-methylbenzylidene-o-methylbenzlidene sorbitol di-(p-methylbenzylidene)sorbitol m-methylbenzylidene-p-methylbenzylidene sorbitol 1.3-heptanylidenesorbitol 1.3,2.4-diheptanylidenesorbitol 1.3,2.4-di(3-nonyl-3-pentenylidene)sorbitol 1.3-cyclohexanecarbylidenesorbitol 1.3,2.4-dicyclohexanecarbylidenesorbitol 1.3,2.4-di(p-methylcyclohexanecarbylidene)sorbitol 1.3-benzylidenesorbitol 1.3,2.4-dibenzylidene-D-sorbitol 1.3,2.4-di(m-methylbenzylidene)sorbitol 1.3,2.4-di(p-methylbenzylidene)sorbitol 1.3,2.4-di(p-hexylbenzylidene)sorbitol 1.3,2.4-di(l-naphthalenecarbylidene)sorbitol 1.3,2.4-di(phenylaceylidene)sorbitol 1.3.2.4-di(methylbenzylidene)sorbitol 1.3.2.4-di(ethylbenzylidene)sorbitol
1.3.2.4-di(propylbenzyledene)sorbitol
1.3.2.4-di(methoxybenzylidene)sorbitol
1.3.2.4-di(ethoxybenzylidene)sorbitol
1.3.2.4-di(p-methylbenzylidene)sorbitol
1.3.2.4-di(p-chlorobenzylidene)sorbitol
1.3.2.4-di(p-methoxydenzylidene)sorbitol
1.3.2.4-di(alkyldenzylidene)sorbitol
1.3.2.4-di(methylbenzylidene)sorbitol aluminum benzoate, etc.

A suitable blending amount of the organic nucleating agent is 0.01 to 3 wt. %, preferably 0.03 to 2 wt %, particularly preferably 0.05 to 1 wt. %. When the blending amount is less than 0.01 wt. % the blending effect is insufficient. On the other hand, when the blending amount exceeds 3 wt. %, the effect by the excess amount is very small, and conversely, various disadvantages occur, such as the generation of microgrits, the generation of substances adversely affecting photographic photosensitive materials, and the like.

Preferable nucleating agents are organic nucleating agent of dibenzylidenesorbitol compounds, and the di-substituted benzylidenesorbitol compositions described below are particularly preferable for the polyolefin resins, preferably propylene-α-olefin random copolymer resins, homopolyethylene resins having a density of not less than 0.910 g/cm$^3$ and ethylene-α-olefin copolymer resins having a density of not less than 0.870 g/cm$^3$, which belong to the crystalline resin of the invention, in view of the improvement in physical strength, rigidity and film molding speed, the decrease of molding troubles, and the improvement in offensive odor and bleeding out which are the defects of conventional organic nucleating agent.

The di-substituted benzylidenesorbitol composition contains solid powder of the dibenzylidenesorbitol derivative represented by the following general formula and the following higher fatty acid as the essential components, and the surface of the solid powder of the dibenzylidenesorbitol derivative is coated with the higher fatty acid.

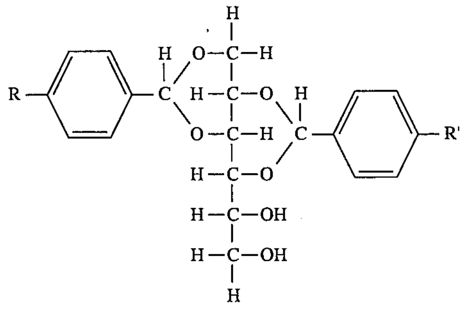

In the formula, R and R' independently represent an atom or a group selected from chlorine atom, methyl group and ethyl group, preferably chlorine atom or methyl group.

$CH_3(CH_2)_nCOOH$

In the formula, n represents a number of 14 to 30, preferably 18 to 27, particularly preferably 20 to 25.

Preferable dibenzylidenesorbitol derivatives of the above general formula are 1.3,2.4-di(p-methylbenzylidene) sorbitol, 1.3,2.4-di(p-ethylbenzylidene)sorbitol, 1.3-p-methylbenyilidene-2.4-p-chlorobenzylidenesorbitol, 1.3-p-methylbenzylidene-2.4-p-ethylbenzylidenesorbitol, 1.3-p-chlorobenzylidene-2.4-p-methylbenzylidensorbitol and the like. Particularly preferable dibenzylidenesorbitol derivatives are 1.3,2.4-di(p-methylbenzylidene)sorbitol, 1.3-p-methylbenzylidene-2.4-p-chlorobenzylidene sorbitol and 1.3-p-chlorobenzylidene-2.4-p-methylbenzylidenesorbitol.

Preferable higher fatty acids are behenic acid, stearic acid and palmitic acid. Behenic acid is the most preferable, and stearic acid is in the second place.

The particle size of the solid powder of the dibenzylidene sorbitol derivative is not particularly limited, but a particle size distribution of 30 to 100 mesh is preferred.

Preferable organic nucleating agent composition contains 95 to 50 parts by weight, preferably 90 to 50 parts by weight, of the dibenzylidenesorbitol and 5 to 50 parts by weight, preferably 10 to 50 parts by weight, of the higher fatty acid so that the total of both components is 100 parts by weight.

The di-substituted dibenzylidenesorbitol can be prepared by adding the solid powder of the dibenzylidenesorbitol derivative to an aqueous emulsion containing the higher fatty acid in the above ratio, stirring to form a coating layer of the higher fatty acid on the surface of the solid powder of the dibenzylidenesorbitol derivative, filtering out the dibenzylidenesorbitol derivative powder coated with the higher fatty acid, washing followed by drying. The above aqueous emulsion of the higher fatty acid is prepared by dispersing an organic solvent solution of the higher fatty acid in a concentration of 5 to 50 wt. %, preferably 10 to 50 wt. % into water together with a small amount, such as 1 to 10 parts by weight, preferably 2 to 5 parts by weight, of surfactant. The presence of the higher fatty acid coating formed on the surface of the solid powder of the dibenzylidenesorbitol derivative can be confirmed by coloring the coating using a dye and then observing.

The polyolefin resin, to which the preferable organic nucleating agent composition is blended as an additive in order to improve physical strength and to decrease bleeding out and odor, includes homopolymers and copolymers of aliphatic monoolefin having a number of carbon atoms of 2 to 6, such as homopolypropylene resin, low density homopolyethylene resin, high density homopolyethylene resin, linear polyethylene (ethylene-α-olefin copolymer) resin, ethylene-propylene copolymer resin and the like, having a number average molecular weight of about 10,000 to 1,000,000 preferably 15,000 to 500,000, more preferably 20,000 to 200,000 the most preferably 30,000 to 150,000. Since the blending effect of the organic nucleating agent is exercised by a polyolefin resin having a high crystallinity, a suitable crystallinity of the polyolefin resin is 60% or more, preferably 70% or more, more preferably 80% or more, the most preferably 90 % or more. A suitable molecular weight distribution (weight average molecular weight/number average molecular weight) is 2 to 20, preferably 3 to 15, more preferably 3.5 to 12, the most preferably 4 to 8.

A suitable blending amount of the di-substituted benzylidenesorbitol composition is 0.01 to 2 parts by weight, preferably 0.05 to 1 parts by weight of the dibenzylidenesorbitol derivative coated with higher fatty acid, per 100 parts by weight of the polyolefin resin.

The di-substituted benzylidenesorbitol composition can be blended into the polyolefin resin by an arbitrary known blending means, and the blend prepared in a high concentration can be used as a masterbatch resin.

In the di-substituted benzylidenesorbitol composition, it is important that the surface of the solid particles of the dibenzylidenesorbitol derivative is coated with the higher fatty acid, and the aforementioned effects cannot be obtained by mere blending of the dibenzylidene sorbitol derivative and the higher fatty acid.

Moreover, in order to obtain the aforementioned effects, a heat history of not less than 180° C., preferably not less than 190° C., particularly preferably not less than 200° C. is necessary. The heat history is sufficient by once. For example, the polyolefin resin composition is blended with 0.01 to 2 wt. % of the above di-substituted benzylidenesorbitol composition, and pelletized with heating at a temperature not less than 180° C., preferably not less than 190° C., particularly preferably not less than 200° C. The pellets are used for molding a light-shielding polyolefin resin film or the like. Even when the molding resin temperature is less than 180° C., the aforementioned effects are obtained. However, by rendering the molding resin temperature also not less than 180° C. (i.e. twice heat history of not less than 180° C. ), the molded light-shielding polyolefin resin film is very excellent in physical properties and rigidity, and has a high surface gloss and rare occurrence of wrinkling and streaks.

The di-substituted benzylidenesorbitol composition exhibits various advantages compared with conventional organic nucleating agent, such as not degrading various properties, such as physical strength, bleeding out and rigidity, but occasionally improving the properties, being excellent in odorless property, resistance to wrinkling and streaks, the improvement in film moldability, film forming speed and the decrease of molding trouble, by blending the polyolefin resin composition. That is, light-shielding molded articles for photographic photosensitive materials excellent in physical strength, rare bleeding out, odorless property, film moldability and wear resistance can be provided by blending the polyolefin resin composition of the invention with the di-substituted benzylidenesorbitol composition.

Although the reason why the di-substituted benzylidenesorbitol composition exhibits the above excellent effects is not clear, it can be considered that benzaldehyde, which is a raw material of conventional dibenzylidenesorbitol, and benzaldehyde derivatives such a p-substituted benzaldehyde which are raw materials of the dibenzylidene sorbitol derivative of the invention, have odor, and a trace amount thereof unavoidably remains in dibenzylidenesorbitol or its derivative after purification to cause offensive odor of the light-shielding polyolefin resin, and that a small amount of dibenzylidenesorbitol or its derivative is decomposed during molding the light-shielding polyolefin resin film to cause offensive odor. By satisfying the requirement of using the solid particles of the dibenzylidenesorbitol derivative of the aforementioned formula and coating them with the higher fatty acid of the aforementioned formula, the di-substituted benzylidenesorbitol composition exhibits the effect of sharply decreasing the offensive odor of the molded articles of the invention and the effect of improving the aforementioned various properties, such as rigidity and physical strength.

Various organic nucleating agent may be used as a single material or combined with inorganic nucleating agent or with one or more other organic nucleating agent. The surface of organic and/or inorganic nucleating agent may be coated with various lubricant, such as fatty acid, fatty acid compound or silicone, coupling agent, plasticizer, dispersing agent such as surfactant, wetting agent or the like.

A suitable blending amount of the nucleating agent is 0.01 to 2 wt. %, preferably 0.05 to 1 wt. %, particularly preferably 0.07 to 0.5 wt. % in total. When the blending amount is less than 0.01 wt. %, the blending effect is insufficient. When the blending amount exceeds 2 wt. %, the effect by the excess amount is almost none. Conversely, various disadvantages occur according to the kind of nucleating agent, such as adverse affect upon photographic photosensitive materials, the generation of offensive odor, adhesion to mold, bleeding out and the decrease of dropping strength.

As the method of blending the nucleating agent, there are the compound method, the dry blending method, the masterbatch method, and the like, and the masterbatch method is preferred. It is preferable to blend upon producing coloring masterbatch, in view of cost and workability. Since the nucleating agent is bulky and tends to fly away, to blend a small amount of dispersing agent or wetting agent is preferred. Suitable dispersing agents include various lubricants, various low molecular weight polyolefin resins having a number average molecular weight of 500 to 10,000, various waxes, various carboxylic acid anhydrides, various higher fatty acids, etc., and lubricants such as various fatty acid metal salts, various silicones and oleic amide are particularly preferred. As the wetting agent, plasticizers such as DOP and DHP can be used.

It is also preferred to prevent the bleeding out by coating or blending a fatty acid or a fatty acid compound, such as a higher fatty acid, a fatty acid amide or a fatty acid metal salt onto or with the organic nucleating agent. Furthermore, the blending effect of the nucleating agent is improved by using in a form of pellets formed by blending with a polyolefin resin having a heat history at not less than 180° C., preferably not less than 190° C., particularly preferably not less than 200° C. By blending these additives, physical strength is improved, white powder generation caused by abrasion can be decreased by increasing rigidity, and white powder generation caused by crystallization or bleeding out of the organic nucleating agent can also be decreased. Moreover, uncomfortable odor of the organic nucleating agent is prevented, and antistatic ability and antiblocking ability are improved. In this case, it is preferable to blend the aforementioned various antioxidant in order to prevent the degradation, oxidative decomposition and coloring of the above various dispersing agent and various thermoplastic resin.

Inorganic nucleating agent includes an alkali metal hydroxide, such as lithium hydroxide, sodium hydroxide and potassium hydroxide, an alkali metal oxide, such as sodium oxide, an alkali metal carbonate, such as lithium carbonate, sodium carbonate, potassium carbonate, sodium hydrogen carbonate and potassium hydrogen carbonate, an alkaline earth hydroxide, such as calcium hydroxide, magnesium hydroxide and barium hydroxide, an alkaline earth oxide, such as calcium oxide, and an alkaline earth carbonate, such as calcium carbonate.

The nucleating agent is not limited to the above compounds, and any known nucleating agent may be employed. Moreover, two or more nucleating agents may be used simultaneously. A suitable blending amount of inorganic nucleating agent is 0.01 to 5 wt. %, preferably 0.05 to 3 wt. %

By blending the nucleating agent, various effects are obtained. For example, by blending 0.1 part by weight of p-t-butylbenzoate as the nucleating agent with 100 parts by weight of propylene-ethylene copolymer resin which is crystalline thermoplastic resin, haze can be decreased from 40% to 21%. When 0.2 part by weight is blended, haze is further decreased to 12%. By blending 0.1 part by weight, tensile yeild stress can be improved from 380 kg/cm$^2$ to 420 kg/cm$^2$. Although a further amount is blended, the tensile yield stress is improved scarcely. When 0.1 part by weight is blended, bending elastic modulus is improved by 500 to 600 kg/cm$^2$. Although a further amount is blended, the bending elastic modulus is improved scarcely.

In order to improve dispersibility of light-shielding material, an acid-modified polyolefin resin may be blended. The acid-modified polyolefin resin is a modified resin of polyolefin resin graft-modified with unsaturated carboxylic acid compound, and includes graft-modified polyethylene resin, graft-modified polypropylene resin, and graft-modified ethylene copolymer resins, such as graft-modified ethylene-ethyl acrylate copolymer resin, graft-modified ethylene-vinyl acetate copolymer resin, graft-modified LLDPE resin and graft-modified ethylene-methyl acrylate copolymer resin, and the like.

The unsaturated carboxylic acid compound usable as the modifier of the polyolefin resin is acrylic acid, methacrylic acid, crotonic acid, isocrotonic acid, fumaric acid, maleic acid, itaconic acid, citraconic acid, angelic acid, tetrahydrophthalic acid, sorbic acid, mesaconic acid, nudic acid (end-cis-bicyclo[2,2,1]-hepto-5-en-2,3-dicarboxylic acid), maleic anhydride, itaconic anhydride, citraconic anhydride, methyl acrylate, methyl methacrylate, ethyl methacrylate, ethyl acrylate, n-butyl acrylate, glycidyl acrylate, glycidyl methacrylate, glycidyl maleate n-butyl methacrylate, maleic acid monoethyl ester, maleic acid diethyl ester, fumaric acid monoethyl ester, fumaric acid dimethyl ester, itaconic acid diethyl ester, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N, N-dibutylamide maleimide, N-butylmaleimide, N-phenylmaleimide, malonyl chloride, monomethylmaleate, dimethylmaleate, dipropylmaleate, potassium acrylate, sodium acrylate, zinc acrylate, magnesium acrylate, calcium acrylate, sodium methacrylate, potassium methacrylate, or the like. Two or more unsaturated carboxylic acid compounds may be combined. Preferable unsaturated carboxylic acid compounds are acrylic acid, maleic acid, maleic anhydride and nudic acid, and maleic anhydride is particularly preferred. A suitable amount of the unsaturated carboxylic acid compounds is 0.01 to 20 parts by weight, preferably 0.2 to 5 parts by weight, per 100 parts by weight of the polyolefin base resin in view of securing adhesive strength.

The grafting modification method may be any known method, such as the method of reacting in a melted state disclosed in Japanese Patent KOKOKU No. 43-27421, the method of reacting in a solution state disclosed in Japanese Patent KOKOKU No. 44-15422, the method of reacting in a slurry state disclosed in Japanese Patent KOKOKU No. 43-18144 and the method of reacting in a vapor state disclosed in Japanese Patent KOKOKU No. 50-77493. Among them, the melting method using an extruder is preferred because of simple operation and inexpensiveness.

A peroxide is added in order to accelerate the reaction between the polyolefin base resin and the unsaturated carboyxlic acid. Suitable peroxides are organic peroxides such as benzoyl peroxide, lauroyl peroxide, dicumyl peroxide, α, α'-bis(t-butylperoxydiisopropyl)benzene, 2,5-dimethyl-2,5-di(t-butylperoxy)hexane, 2,5-dimethyl-2,5-di(tbutylperoxy)hexyne, di-t-butyl peroxide, cumene hydroperoxide, t-butyl-hydroperoxide, t-butylperoxylaurate, t-butylperoxybenzoate, 1,3-bis(t-butylperoxyisopropyl) benzene, di-t-butyl-diperoxyphthalate, t-butylperoxymaleic acid and isopropyl percarbonate, azo compounds such as azobisisobutyronitrile, and inorganic peroxides such as ammonium persulfate. Two or more peroxides may be combined. Particularly preferred peroxides are di-t-butylperoxide, dicumylperoxide, 2,5-dimethyl-2,5-di(t-butylperoxy)hexane, 2,5-dimethyl-2,5-di(t-butylperoxy)hexyne, 1,3-bis(t-butylperoxyisopropyl)benzene and the like, which have a decomposition temperature between 170° C. and 200° C. A suitable amount of the peroxide is 0.005 to 5 parts by weight, preferably 0.01 to 1 part by weight per 100 parts by weight of the polyolefin base resin.

There are commercial adhesive polyolefin resins, such as "N polymer" (Nippon Petrochemicals), "Admer" (Mitsui Petrochemical Industries), "ER Resin" (Showa Denko), "Novatec-AP" (Mitsubishi Chemical Industries), "Modic" (Mitsubishi Petrochemical), "NUC-Ace" (Nippon Unicar), "Ube Bond" (Ube Ind.), "Bondain" (Sumitomo Chemical), "Melcene M" (Toso), "CMPS" (Mitsui Polychemicals), etc.

A suitable blending amount of the acid-modified polyolefin resin is 3 to 45 wt. %, preferably 5 to 40 wt. %, particularly preferably 7 to 30 wt. %. When the blending amount is less than 3 wt. %, the blending effect is insufficient. When the blending amount exceeds 45 wt. %, characteristics of the rubber-containing aromatic monovinyl resin is degraded, and it is difficult to put to practical use as the molded article for a photographic photosensitive material requiring dimensional accuracy.

In the molded article for a photographic photosensitive material of the invention, various additives blended in known molded articles for a photographic photosensitive material can be blended.

As the molded article for a photographic photosensitive material applicable to the invention, there are spools for a photographic film, film units with a lens, containers for a photographic film cartridge, light-shielding containers, cartridges for a photographic film made of plastic, photographic photosensitive material sheets and rolls, light-shielding magazines for light room loading, cores, photographic film cartridges, packs for an instant film, sheet-formed photographic film holders, photographic film cameras, packs for cut films, developing apparatuses for photographic photosensitive materials, etc. which require to ensure complete light-shielding and photographic properties.

Cartrige for disc film: Japanese Utility Model KOKAI No. 60-21743, etc.

Film unit with lens: Japanese Patent KOKAI No. 63-226643 (FIG. 12)

Spool for photographic film: Japanese patent KOKAI Nos. 1-251030, 57-196218, 59-15049, 58-203436, 58-82237, 58-82236, 62-240957, Japanese Utility Model KOKAI Nos. 63-73742, 54-120931, 58-178139-178145, 63-73742, Japanese Utility Model KOKOKU Nos. 55-31541, 44-16777, U.S. Pat. No. 1,930,144, GB 2199805A (FIG. 10)

Cartridge for photographic film: Japanese Patent KOKAI Nos. 54-111822, 50-33831, 56-87039, 1-312538, 57-190948, Japanese Patent KOKOKU Nos. 45-6991, 55-21089, Japanese Utility Model KOKAI No. 55-97738, U.S. Pat. No. 4,846,418, U.S. Pat. No. 4,848,693, U.S. Pat. No. 4,887,776, etc. (FIG. 11)

Container for photographic film cartridge: Japanese Patent KOKAI Nos. 61-250639, 61-73947, 63-121047, 62-291639, Japanese Utility Model KOKAI Nos. 60-163451, 1-88940, 1-113235, 1-152337, Japanese Utility Model KOKOKU Nos. 2-33236, 3-48581, Japanese Patent KOKOKU No. 2-38939, U.S. Pat. No. 4,801,011, U.S. Pat. No. 4,979,351, EP 02370562A2, EP 0280065A1, EP 0298375A2, etc. (FIGS. 8,9)

Core, Reel: Japanese Utility Model KOKAI No. 60-107848, U.S. Pat. No. 4,809,9.23, GB 2,033,873 B, etc.

Magazine for sheet films: Japanese Utility Model KOKAI No. 56-5141, etc.

Photographic film cartridge: Japanese Patent KOKAI No. 1-312537, Japanese Utility Model KOKAI Nos. 2-24846, 2-29041, 60-120448, Japanese Utility Model KOKOKU No. 56-16610, etc. (FIG. 14)

Photographic film case: Japanese Utility Model KOKAI No. 54-100617, 64-32343, 1-94258, 2-56139, Japanese Patent KOKO KU No. 2-54934, U.S. Pat. No. 4,779, 756, EP 0242905A1, etc. (FIG. 13)

Instant film pack: Japanese Patent KOKAI No. 62-240961, Japanese Utility Model KOKAI No. 61-41248, etc.

Cartridge for photographic film made of resin: Japanese Patent KOKAI Nos. 50-33831, 57-190948, 1-312538, Japanese Patent KOKOKU Nos. 45-6991, 55-21089, Japanese Utility Model KOKAI No. 55-97738, U.S. Pat. No. 4,834,306, U.S. Pat. No. 4,846,418, U.S. Pat. No. 4,887,776, etc.

The molded article for a photographic photosensitive material of the invention is applicable to the following photosensitive materials.

Silver halide photographic photosensitive materials: films for printing, color and monochromatic photographic printing papers, color and monochromatic films, master papers for printing, DTR (diffusion transfer process) photosensitive materials, films and papers for computerized type-setting system, color and monochromatic positive films, color reversal films, microfilms, films for movie, self-developing type photographic photosensitive materials, direct positive films and papers, etc.

Heat developing photosentsitive materials: heat developing color photosensitive materials, heat developing monochromatic photosensitive materials, e.g. disclosed in Japanese Patent KOKOKU Nos. 43-4921, 43-4924, "Shashinkogaku-no Kiso (Fundamentals of Photographic Engineering), Vol. Silver Salt Photograph", pp 553–555, Corona, 1979, "Research Disclosure", pp 9–15 (RD-17029), June, 1978, transfer-type heat developing color photosensitive materials disclosed in Japanese Patent KOKAI Nos. 59-12431, 60-2950, 61-52343, U.S. Pat. No. 4,584,267, etc.

Photosensitive heatsensitive recording materials: recording materials using photothermography (photosensitive heatsensitive image forming method) disclosed in Japanese Patent KOKAI No. 3-72358.

Diazonium photographic photosensitive materials: 4-morpholinobenzene diazonium microfilms, microfilms, copying films, form plates for printing, etc.

Azide, diazide photographic photosensitive materials: photosensitive materials containing paraazidobenzoate, 4, 4'-diazidostilbene, etc., such as copying films and form plates for pringing etc.

Quinone diazide photographic photosensitive materials: photosensitive materials containing ortho-quinone diazide compounds or ortho-naphthoquinone diazido compounds such as benzoquinone-(1,2)-diazido-(2)-4-sulfonic acid phenyl ether, such as form plates for printing, copying films and contact printing film, etc.

Photo polymers: photosensitive materials, form plates for printing, contact printing films, containing vinyl compound monomer, etc.

Polyvinyl cinnamate esters: printing films, photoresists for IC, etc.

Moreover, the packaging materials of the invention is also applicable to various photosensitive materials degraded or denatured by light, oxygen, sulfur dioxide gas or the like, such as foods including peanuts with butter, margarine, snacks, relishs, cakes, teas and lavers, medicines including powder and granular medicines placed in a bag for stomach and bowels and for cold, dyes, pigments, photographic developing agent, photographic fixing agent, toners and the like.

A method of manufacturing the molded article for a photographic photosensitive material of the invention comprises injecting the resin composition heated to a temperature of 150° C. or higher into a mold having a wall temperature of 70° to 200° C. at the core and cavity portions and taking out the molded article formed in the mold when the wall temperature becomes a glass transition temperature of the styrene resin in the resin composition or lower.

A suitable wall temperature of the core and cavity portions is 100° to 200° C. When the wall temperature is lower than 70° C., resin fluidity is degraded, and short shot and weld lines are liable to occur. Impact strength of the molded article is degraded. When the wall temperature exceeds 200° C., thermal degradation of resin increases to generate substances adversely affecting photographic properties of photographic photosensitive materials, to generate lumps (black brown agglomerates of foreign material) and to generate fouling of the mold surface. Accordingly, continuous injection molding for a long time is difficult.

The molded article is taken out, when the wall temperature of the core and cavity portions becomes a glass transition temperature of the rubber-containing aromatic monovinyl resin, particularly styrene resin, or lower, preferably not higher than 50° C., more preferably not higher than 40° C. When the molded article is taken out at a temperature higher than the glass transition temperature, deformation of the molded article occur, and the molded article is inferior in dimensional stability.

The form of resin pellets, which are used for manufacturing the molded article for a photographic photosensitive material of the invention, is preferably one or two similar to each other which are selected from sphere, cylinder, prism, plate, square and rectangle, for the purpose of ensuring uniform melting ability (effective for the prevention of lump generation) of resin and of uniforming upon blending two or more resins (e.g. masterbatch and resin for dilution). Particularly preferably forms are sphere and cylinder in view of pneumatic transportion of pellets and the prevention of powder generation. A suitable diameter or side of pellets is 0.5 to 10 mm, preferably 1 to 8 mm, more preferably 2 to 7 mm, the most preferably 3 to 6 mm. In order to ensure uniform melting and the like, the volume of each pellet is preferably almost the same, within three times in the difference of the volume.

In order to prevent foaming, short shot and silver streaks, the water content of the rubber-containing aromatic monovinyl resin composition is not more than 1 wt. %, preferably not more than 0.8 wt. %, particularly preferably not more than 0.5 wt. % of the bone-dry weight.

The molded article of the invention may be provided with letters and marks which are required on the functional viewpoint or with print in order to improve the value as commercial goods. The ink used for printing them can be selected from harmless inks to photosensitive materials among conventional inks for offset printing, inks for gravure printing or UV inks.

Representative synthetic resins used or the inks are vinyl chloride copolymer resins, vinyl-amino resin, alkyd-vinyl resin, oil-free alkyd resin, vinyl chloride-vinyl acetate copolymer resins, nitrocellulose, polyester, polyamide- urethane resin, polyacrylic resin, rosin-modified maleic acid resin, ethylene-vinyl acetate resin, vinyl ether resin, urethane vinyl acetate resin, vinylchloride-vinylacetate copolymer urethane resin, modified alkyd resin, modified phenol resin, high molecular weight polyester-amino resin, low molecular weight polyester-amino resin, oil-free polyester resin, alkali- soluble resins (rosin-modified maleic acid resin, styrene-maleic acid resin, styrene-acrylic acid resin, acrylate ester-acrylic acid resin, methacrylate ester-acrylic acid resin), hydrosol type resins (styrene-maleic acid resin, styrene-acrylic acid resin, α-methylstyrene-acrylic acid resin, acrylate ester-acrylic acid resin, methacrylate ester-acrylic acid resin), emulsion type resins (styrene resin, styrene-acrylate ester resin, acrylate ester copolymer resins, methacylate ester copolymer resins), and the like. As the resins used for UV ink, polymers having acrylic unsaturated groups are, in general, used, and representative examples are polyester/acrylate ester, polyester/urethane resin/acrylate ester, epoxy resin/acrylate ester, pentaerythritol triacrylate, trimethylol propane triacrylate, hexanediol diacrylate, neopentylglycol diacrylate, triethylene glycol diacrylate, hydroxyethyl methacrylate, etc.

The film thickness of UV ink affects photographic photosensitive materials, such as fogging, abnormal sensitivity or abnormal coloring, and a suitable thickness is 0.1 to 10 μm, preferably 0.5 to 8 μm, particularly preferably 1 to 5 μm. In order to improve adhesive strength to the molded article, it is preferable to provide anchor coating or corona discharge onto the surface of the molded article or heating the surface of the molded article at 40° C. or more, preferably 50° C. or more, prior to printing.

Coloring pigments generally known are used for the above inks. The coloring pigments include various pigments disclosed in Japanese Patent KOKAI No. 63-44653, etc., azo pigments, (Azo Lake, Carmine 6B, Red 2B, insoluble azo pigments, Monoazo Yellow (PY-1,-3), Disazo Yellow (PY-12,-13, -14,-17,-83), Pyrazolo Orange (PO-B-34), Vulcan Orange (PO-16), condensed azo pigments, Chromophthal Yellow (PY-93, -95), Chromophthal Red (PR-144,-166)), polycyclic pigments (phthalocyanine pigments, Copper Phthalocyanine Blue (PB-15,-15.1,-15.3), Copper Phthalocyanine Green (PG-7)), dioxane pigments (Dioxane Violet (PV-23)), isoindolinone pigments (Isoindolinone Yellow (PY-109,-110)), durene pigments, perillene, perinone, flavanthrone, thoindigo, lake pigments, (Malachite Green, Rhodamine B, Rhodamine G, Victoria Blue B), inorganic pigments, such as oxides (titanium dioxide, red iron oxide), sulfates (precipitated barium sulfate), carbonates (precipitated calcium carbonate), silicates (hydrous silicates, anhydrous silicates,), metal powders (aluminum powder, bronze powder, zinc powder), carbon black, lead yellow, Ultramarine blue, Berlin blue, and the like. In addition, oil-soluble dyes, disperse dyes, and the like are also usable. Other raw materials composing the ink which are optional are various solvent, dispersing agent, wetting agent, antifoamer, leveling agent, thickener, stabilizer, crosslinking agent wax and the like.

It is also preferable that the above synthetic resins and coloring pigments are applied as paint onto the surface of the molded article or a package of the molded article by a known method for the purpose of the improvement in commercial values as goods, wear resistance, light-shielding ability, photographic properties and the like.

A package of a photographic photosensitive material comprises the photographic photosensitive material, the molded article of the invention, and a moistureproof packaging material having a moisture permeability according to JIS Z 0208, condition B of 5 $g/m^2$.24 hours or less which packages and seals the molded article.

As the moistureproof packaging material, there are single layer themoplastic resin films, laminated films formed of various flexible sheets (paper, cellophane, metal foil, thermoplastic resin film, metallized film, metallized paper, etc.) laminated through an adhesive layer, coextruded multilayer films formed by simultaneous coextrusion of plural thermoplastic resin films, laminated films formed by joining the inner layers of a coextruded multilayer inflation film, and the like. As the thermoplastic resin film, there are various resin films which are unstretched, uniaxially stretched, biaxially stretched or the like.

The moisture permeability of the moisureproof packaging material is not more than 5 $g/m^2$.24 hours, preferably not more than 3 $g/m^2$.24 hours, more preferably not more than 1.5 $g/m^2$.24 hours, measured by JIS Z 0208, condition B. When the moisture permeability exceeds 5 $g/m^2$.24 hours, a photosensitive layer containing gelatin which is a hydrophilic polymer absorbs moisture and becomes adhesive. As a result, adhesion troubles occur, and photographic properties, such as the reduction of sensitivity and the increase of fogging, of photographic photosensitive materials are adversely affected by the degradation of various dyes in the photosensitive layer. Particularly, the above problems greatly occur in high sensitivity photographic photosensitive materials having an ISO pohotographic speed of 100 or more, and therefore, to ensure moistureproofness is important.

The above package is preferably provided with at least one of a deodorant, an agent imparting fragrance, an oxygen scavenger, moisture absorber and an inorganic substance having ion-exchange ability at at least one of the photographic photosensitive material, the molded article and the moistureproof packaging material.

The deodorant, the agent imparting fragrance, and the oxygen scavenger are as mention previously.

As the moisture absorber, there are water-absorptive resins containing carboxyl group, alkali metal salts of crosslinking polyacrylate, ethylene copolymer resins containing carboxyl group, alkali metal salt of acrylate-graft starch crosslinking agent, crosslkinked polyvinyl alcohol-alkali metal salt of acrylate copolymer cosslinked polyvinyl alcohol-maleic anhydride copolymer, modified celluloses, water-soluble polymer crosslinking agent, self-crosslinking type alkali metal salt of acrylate copolymer, polyacryic acid and alkali salts thereof, polyacrylamide and partial hydrolyzate thereof, polyvinyl pyrrolidone, sulfonated polystyrene, polyacrylamide-2-methylpropane sulfonic acid sodium salt, graft copolymer of starch-acrylonitrile and hydrolyzate thereof, hydrolyzate of polyacrylonitrile, copolymer of acrylamide and acylic acid, carboxymethyl cellulose, vinyl styrene sulfonic acid, Mannich reaction product of polyacrylamide, polyacrylamine, dimethylaminoethylmethacrylate homopolymer and copolymer thereof with acrylamide, homopolymer of quaternary ammonium salt of dimethylaminoethylmethacrylate produced by methyl chloride and copolymer thereof with acrylamide, quaternary ammonium salt of polydimethylallylamine, polymer of quaternary vinyl benzylamine, acetylating agent of chitosan, condensation product of epichlorohydrin and polyvalent amine or monoamine, resin prepared by adsorbing polyamide polyamine epichlorohydrin thermosetting resin on the surface of high water-absorptive resin beads followed by thermosetting, copolymer of hydrophilic vinyl monomer (acrylamide derivative, etc.) and hydrophobic vinyl monomer (methacrylate derivative, etc.), sodium salt of isobutylene-maleic anhydride copolymer, sodium salt of starch and acrylic acid and acrylic acid derivative graft copolymer, partially crosslinked carboxymethyl cellulose-polybasic acid, partially crosslikned polyacrylic acid, surface-coated high water-absorptive polymer, blends of high water-absorptive polymer and inorganic material (attapulgite, kaolin, talc, diatomaceous earth, etc.), mixture of high water-absorptive resin having anionic dissociative group and high water-absorptive resin having cationic dissociative group, starch-acrylic acid-sodium acrylate copolymer, starch-sodium acrylate copolymer, etc. Preferable moisture absorbers are produced from starch, cellulose or synthetic polymer having a great water absorbability.

The inorganic substance having ion-exchange ability is as mentioned previously.

As the means of providing at least one of the deodorant, the agent imparting fragrance, the oxygen scavenger, the moisture absorber and the inorganic substance having ion-exchange ability, there are to contain directly in the moistureproof packaging material, to adsorb on dextrin, zeolite, talc, starch or the like, to apply onto the surface of the moistureproof packaging material, and the like.

In the molded article for a photographic photosensitive material of the invention, the rubber-containing aromatic monovinyl resin containing 1 to 12 wt. % of a rubber material which has specific properties ensures dimensional accuracy and physical strength. The light-shielding material ensures complete light-shielding ability and adsorbs substances adversely affecting photographic photosensitive materials to render harmless. The lubricant and the antistatic agent improves the dispersibility of the light-shielding material and slipping character and prevents so as not to form static marks on photographic photosensitive materials. The inorganic substance having ion-exchange ability and the antioxidant render photographic properties of photographic photosensitive materials good and continuous injection molding possible for a long time.

In the manufacturing method of the molded article for a photographic photosensitive material of the invention, resin fluidity is improved. As a result, the occurrence of short shot and weld lines is prevented, and molding troubles are decreased. Moreover, physical strength is sharply improved.

In the package of a photographic photosensitive material of the invention, the moistureproof packaging material prevents to enter moisture into the package, and keeps the quality of the photographic photosensitive material for a long time.

As a result, in the molded article for a photographic photosensitive material of the invention, adverse affects upon photographic properties are rare, and physical strength, moldability and the like are improved.

In the manufacturing method of the molded article for a photographic photosensitive material of the invention, weld lines, silver streaks, foaming and the like are decreased, Izod impact strength is improved, and deformation can be made small due to a small injection pressure.

The package of a photographic photosensitive material is excellent in suitability for users, removal of offensive odor, and can keep the quality of the photographic photosensitive material in good conditions for a long time.

Some preferable embodiments of the invention are described below.

(1) The molded articles descried in the claims wherein the mean particle size of the rubber material is 0.2 to 5 μm.

(2) The molded article described in the claims wherein the inorganic substance having ion-exchange ability is zeolite having a mean particle size of 0.01 to 10 μm, and the light-shielding material is carbon black having a pH of 5 to 9 and a mean particle size of 10 to 90 mμ.

(3) The molded articles described in the claims wherein the rubber-containing aromatic monovinyl resin is a blend of rubber-modified styrene resin and homopolystyrene resin.

(4) The molded articles described in the claims, the light-shielding material is dispersed into the resin composition by forming masterbatch pellets, mixing the masterbatch pellets with aromatic monovinyl resin pellets containing a rubber material for dilution, and then kneading the mixture with heating at 150° C. or more.

(5) The molded articles described in the claims wherein the mean particle size of the rubber material is 0.2 to 1.0 μm, and the reflection glossiness of the molded article of 75% or more.

(6) The molded articles described in the claims wherein the mean particle size of the rubber material is 1.1 to 5 μm, and the reflection glossiness of 70% or less.

(7) The package for a photographic photosensitive material described in claim 12 which is made by leaving the molded article for a photographic photosensitive material in the atmosphere at a temperature of 15° to 50° C. at a humidity of 20 to 80% RH for 5 minutes to 24 hours, applying the photographic photosensitive material and then making the package.

(8) The molded articles described in the claims wherein the surface of the light-shielding material is coated with a surface-coating material.

(9) The molded articles described in the claims wherein the light-shielding material is coated with a surface-coating material and then dispersed in the rubber-containing aromatic monovinyl resin.

(10) The molded articles described in the claims wherein the form of pellets is sphere, cylinder, prism, plate, square or rectangle, having a diameter or side of 1 to 10 mm.

(11) The molded articles described in the claims wherein the rubber-containing aromatic monovinyl resin composition is dried to a water content of not more than 1 wt. % of the bone-dry weight, and then subjected to injection molding.

(12) The molded articles described in the claims wherein a thermoplastic resin formed into one or more forms of beads, powder and granules in the process for manufacturing mastarbatch pellets containing light-shielding material.

(13) The molded articles described in the claims 1,4 or 21 wherein substances adversely affecting photographic photosensitive materials are removed by keeping the hopper and the feed opening of an extruder for the rubber-containing aromatic monovinyl resin composition at a reduced pressure lower than the atmospheric pressure.

(14) The molded articles described in the claims wherein the rubber-containing aromatic monovinyl resin compostion used has a static friction coefficient of not more than 0.40.

(15) The molded articles described in the claims having a wear resistance (abrasion wear of the material under testing) of not more than 50 $mm^3$.

(16) The molded articles described in the claims wherein the rubber-containing aromatic resin composition contains 0.01 to 45 wt. % of a conductive material and/or an antistatic agent, and their surface specific resistance is not more than $10^{12}\Omega$.

(17) The molded articles described in the claims which is colored other than black.

(18) The molded articles described in the claims or the preferable embodiment (1), (6) or (14) to (17) which are spools for a photographic film.

(19) The molded articles described in the claims or the preferable embodiment (1), (5) or (14) to (17) which are cartridges for a photographic film.

(20) The molded articles described in the claims or the preferable embodiment (1), (5) or (14) to (17) which are photographic film units with a lens.

(21) The molded articles described in the claims or the preferable embodiment (1), (6) or (14) to (17) which are instant film units.

(22) The molded articles described in the claims wherein the hydrous double salt which is one of agents for preventing resin degradation is a hydrotalcite compound.

(23) The molded articles described in the claims wherein the phenolic antioxidant is a hindered phenolic antioxidant.

(24) The molded articles described in the claims which is molded of the rubber-containing aromatic monovinyl resin by injection molding using an extruder provided with an apparatus inserted and fixed with the element of a static mixer which is a line mixer without moving part between the extruder and a mold.

(25) The molded articles described in the claims wherein, the rubber-containing aromatic monovinyl resin is a rubber-modified styrene resin wherein,
  (a) 70 wt. % or more of the rubber material is high cis-polybutadiene wherein cis-1, 4-bond is 90 mol. % or more,
  (b) the mean particle size of the rubber material is in the range of 0.5 to 2.5 μm, and
  (c) the resin composition contains 0.005 to 0.2 wt. % as the silicon content of a silicone lubricant of organic polysiloxane.

(26) The molded articles described in the claims which contain 0.01 to 2 wt. % of at least one of organic nucleating agents.

(27) A molded article for a photographic photosensitive material formed of a resin composition comprising (a) 50 wt. % or more of a rubber-containing styrene resin (b) 0.005 to 10 wt. % of a silicone lubricant, (c) 0.005 to 10 wt. % of a lubricant selected from the group consisting of a fatty acid amide lubricant, a hydrocarbon lubricant, a fatty acid lubricant, a fatty acid metal salt lubricant and an alcohol lubricant, and (d) 0.1 to 20 wt. % of a light-shielding material, wherein the total amount of (a), (b), (c) and (d) is 70 wt. % or more.

(28) The molded article described in the claims wherein the resin composition further comprises 0.002 to 10 wt. % in the total of two or more members selected from the group consisting of an antioxidant, an age resistor, an ultraviolet stabilizer, a radical scavenger, an agnet exercising antioxidation synergistically and a hydrous double salt.

(29) The molded article described in the claims wherein the rubber-containing aromatic monovinyl resin is a styrene resin produced by polymerizing 60 to 99 wt. % of a styrene monomer by bulk or suspension polymerization, adding 40 to 1 wt. % of a monomer copolymerizable with the styrene monomer at the time of the polymerization degree of 60% or more, and thereafter completing the polymization.

(30) The molded article described in the claims wherein the rubber-containing aromatic monovinyl resin is a rubber-modified polystyrene modified by a diene rubber and/or a polyolefin rubber produced by continuous bulk polymerization.

(31) The molded article described in the claims which is molded by injection molding, wherein the resin composition is produced by;
  (a) producing light-shieliding material-containing masterbach pellets by dispersing the light-shielding material of which the surface has been coated with a surface-coating material into a thermoplastic resin,
  (b) producing masterbatch comprising the light-shielding material-containing masterbatch pellets, the rubber-containinng aromatic monovinyl resin for dilution, and at least one of the lubricant and the antistatic agent,
  (c) melting and kneading a mixture of the masterbatch produced in (b) and the rubber-containing aromatic monovinyl resin for dilution by an extruder having a screw on the upstream side of a molding machine, and
  (d) molding by injection molding.

(32) The molded article described in the claims wherein the rubber-containing aromatic monovinyl resin is a synthetic rubber-graft modified aromatic vinyl resin which has been produced by graft polymerizing a synthetic rubber with a vinyl compound selected from the group consisting of an aromatic vinyl compound, a vinyl cyanide compound and other copolymerizable vinyl compound.

(33) The molded article described in the claims wherein the rubber-containing aromatic monovinyl resin is a rubber-containing styrene resin prepared by, (a) supplying a screw extruder having exothermic function exercised by shearing through mixing, (b) heating, (c) adjusting the rubber-containing styrene resin to a pressure capable of keeping in a liquid state, and (d) supplying a heated machine for eliminating monomer to remove evaporable substances adversely affecting photographic photosensitive materials by evaporation.

(34) The molded article described in the claims which is molded by injection molding, wherein evaporable substances which adversely affect photographic photosensitive materials in the rubber-containing aromatic monovinyl resin composition have been removed by using a hopper having a heating and/or vacuum function provided at the entrance of an extruder.

(35) The molded article described in the claims wherein the rubber-containinng aromatic monovinyl resin is a rubber-containing styrene-butadiene copolymer resin containing comjugated diene unit-tin bond chains produced by polymerizing 1,3-butadiene and styrene by an organic lithium compound in the presence of an ether compound or a tertiary amine compound in hydrocarbon solvent, and then coupling with a tin compound, wherein a conjugated diene compound is added to polymerize immediately before the coupling.

(36) A molded article for a photographic photosensitive material formed of a resin composition comprising,
  (a) 50 wt. % or more of a rubber-containing styrene resin containing 0.1 to 20 wt. % of a synthetic rubber,
  (b) 0.005 to 10 wt. % of a silicone lubricant which is polydimethylsiloxane, a modified polydimethylsiloxane or a combination thereof,
  (c) 0.005 to 20 wt. % of a lubricant other than silicone lubricant selected from the group consisting of a higher fatty acid lubricant, a higher fatty acid metal salt lubricant, a higher fatty acid amide lubricant, a hydrocarbon lubricant, an alcohol lubricant, and combinations thereof,
(d) 0.01 to 49.9 wt. % of a light-shielding material selected from the group consisting of an inorganic pigment having a refractive index of not less than 1.50, a metal powder, a metal paste, carbon black, graphite and combinations thereof,
(e) 0.001 to 10 wt. % of an agent for preventing degradation selected from the group consisting of an antioxidant, an age resistor, an ultraviolet stabilizer, a radical scavenger, an agent exercising antioxidation synergistically, a hydrous double salt and combinations thereof, wherein the total amount of (a), (b), (c), (d) and (e) is 80 wt. % or more.

(37) A molded article for a photographic photosensitive material formed of a resin composition comprising,
(a) 50 wt. % or more of a rubber-containing styrene resin,
(b) 1 to 40 wt. % of a resin selected from the group consisting of a polyolefin synthetic rubber, an acid-modified polyolefin resin, a low number average molecular weight polyolefin resin having a number average molecular weight of 10,000 or less, and combinations thereof,
(c) 0.01 to 20 wt. % of a lubricant,
(d) 0.01 to 30 wt. % of a white pigment light-shielding material, and/or 0.01 to 30 wt. % of a black pigment light-shielding material,
(e) 0.002 to 10 wt. % of an agent for preventing degradation selected from the group consisting of an antioxidant, an age resistor, an ultraviolet stabilizer, a radical scavenger, an agent exercising antioxidation synergistically, a hydrous double salt and combinations thereof, wherein the total amount of (a), (b), (c), (d) and (e) is 80 wt. % or more.

(38) The molded article described in the claims wherein the agent for preventing degradation consists of (a) 0.001 to 3 wt. % of a phenolic antioxidant, (b) 0.001 to 3 wt. % of a phosphorus-containing antioxidant and (c) 0.001 to 5 wt. % of a hydrous double salt compound, a fatty acid metal salt or a combination thereof, wherein the total amount of (a), (b) and (c) is 0.003 to 7 wt. %.

(39) The molded article described in the claims which contains 1 to 50 wt. % of a recycled rubber-containing aromatic monovinyl resin.

Some forms of the molded article for a photographic photosensitive material of the invention are illustrated in FIGS. 1 through 6.

FIG. 1 is a front view of a photographic film spool 10 as the molded article for a photographic photosensitive material of the invention, and the whole body of the photographic film spool is formed of the resin composition of the invention.

Figure 2:
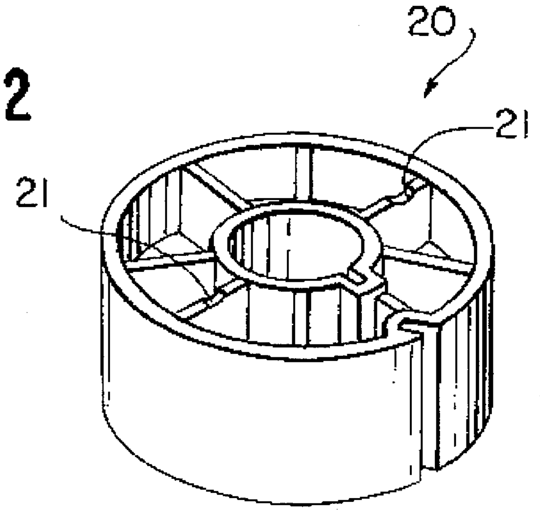
FIG. 2 is a perspective view of a core for a photographic photosensitive a long length strip material which is a molded article for a photographic photosensitive material of the invention.

FIG. 2 is a perspective view of a core 20 for a photosensitive strip material having a long length on the resin gate 21 side, and the whole body of the core 20 for photosensitive material is made of the resin composition of the invention.

Figure 3:
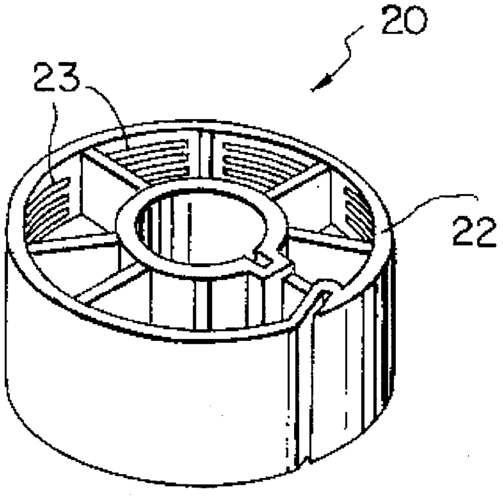
FIG. 3 is a perspective view of another core for a photographic photosensitive a long length strip material which is a molded article for a photographic photosensitive material of the invention.

FIG. 3 is a perspective view of another core 20 for a photosensitive strip material having a long length on the side opposite to the resin gate portions, and the whole body of the core 20 for the photosensitive material is formed on the resin composition of the invention. In the core for a photosensitive strip material, a plurality of circular ribs 23 having a height of 0.02 to 0.7 mm and intervals between the ribs of 0.1 to 5 mm, preferably 0.5 to 3 mm are formed on the inner surface of the outer cylinder portion 22, and improve injection moldability, physical strength and appearance of the core.

FIG. 4 illustrates an exploded perspective view of a photographic film cartridge 30, which is the molded article of the invention, consisting of a lower casing 31, an upper casing 32 and a spool 33 loaded therein, and both of the lower casing 31 and the upper casing 32 and the spool 33 are formed of the light-sheilding thermoplastic resin composition of the invention.

FIG. 5 illustrates an exploded perspective view of a photographic film cartridge 40, which is the molded article of the invention, consisting of an upper casing 41 and a lower casing 42, which constitute the cartridge body, and a spool 43 on which the photographic film to be loaded is wound. All of the upper casing 41, the lower casing 42 and the spool 43 are formed of the thermoplastic resin composition of the invention.

Figure 6:
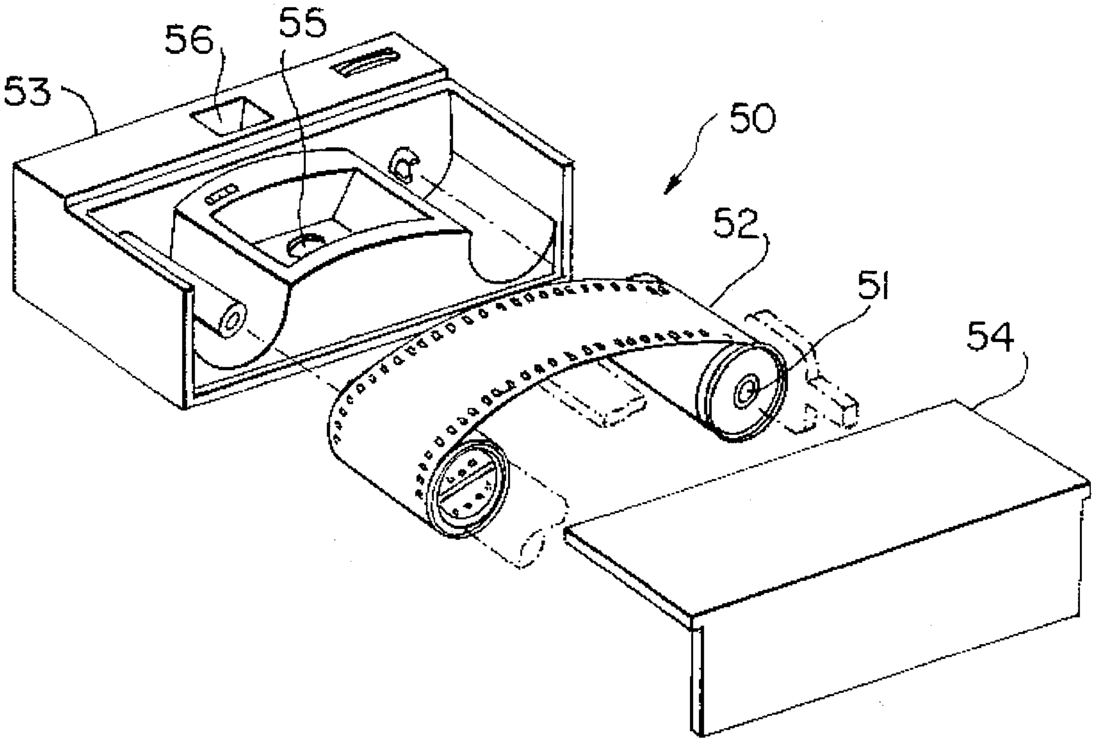
FIG. 6 is an exploded perspective view of a photographic film unit with a lens which is a molded article for a photographic photosensitive material of the invention.

FIG. 6 illustrates an exploded perspective view of a photographic film unit 50 with a lens, which is the molded article of the invention, consisting of a lower casing 53 in which a light-shielding photographic film cartridge 52 containing a photographic film wound around a spool 51 is set in a state shielded from light and an upper casing 54 which seals the lower casing 53 so as to form a light-shelding condition. All of the lower casing 53 and the upper casing 54 and the spool 51 are formed of the resin composition of the invention. In conventional photographic film unit, they are formed of a light-shielding thermoplastic resin composition such as polystyrenre (PS) resin, polymethylmethacrylate (PMMA) resin or polycarbonate (PC) resin, containing carbon black. On the other hand, lens 55, finder 56 and the like are formed of a transparent thermoplastic resin composition, such as PC resin, PS resin or PMMA resin, without colored.

Figure 7:
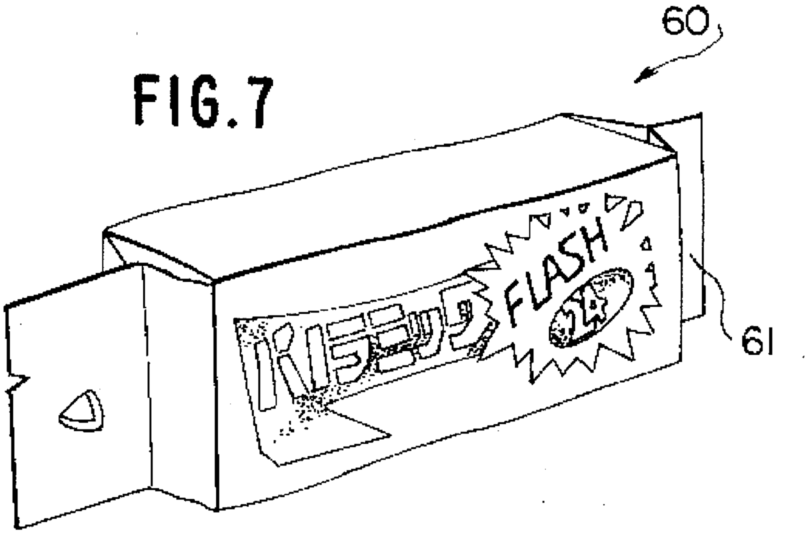
FIG. 7 is a perspective view of a package of a photographic film unit with a lens which is a package of a photographic photosensitive material of the invention.

Some forms of the package for a photographic photosensitive material of the invention are illustrated in FIG. 7 through 9.

The package shown in FIG. 7 is a package 60 of a film unit with a lens and composed of the film unit 62 and a packaging bag 61. The package 60 is, as shown in FIG. 8, made by putting the film unit 62 into the packaging bag 61 of which the inner surface is coated with a moisture absorber, and then sealing the packaging bag 61 by heat sealing.

The package shown in FIG. 9 is an assembly package 70 of 35 mm photographic films in a cartridge wherein a transparent plastic case 72 blended with a moisture absorber is mounted to the base plate 71, and 35 mm photographic films 73 in a cartridge are contained therein.

EXAMPLES

EXAMPLE 1

A spool for a 35 mm photographic film in a cartridge shown in FIG. 1 was molded as the molded article for a photographic photosensitive material of the invention.

Masterbatch pellets were prepared by pelletizing a blend composed of 81 wt. % of styrene-butadiene block copolymer resin having a butadiene rubber content of 5 wt. %, a styrene content of 95 wt. %, a melt flow index (ASTM D 1238-88, Condition G) of 16.2 g/10 minutes, a density (ASTM D-1505) of 1.04 g/cm$^3$, a Rockwell hardness of M42, an Izod impact strength of 6.5 kg.cm/cm, a bending elastic modulus of 22,500 kg/cm$^2$, and a Vicar softening point of 85° C. (pelletized at 220° C. into cylindrical pellets 3 mm in diameter×5 mm in length, glass transition temperature: about 98° C.), 5 wt. % of magnesium stearate as a lubricant, 10 wt. % of polydimethylsiloxane having a viscosity of 20,000 centistokes as a lubricant, 3 wt. % of furnace carbon black having a mean particle size of 25 mμ, a pH of 8.1, an ash content of 0.03 %, a free sulfur content of 0.05 %, an oil absorption value of 82 ml/100 g and a cyanogen compound content of 10 ppm as the light-shielding material, and 1 wt. % of a hindered phenolic antioxidant of tetrakis [methylene-3-(3'.5-di-tert-butyl-4-hydroxyphenyl)propionate]methane at 200° C.

15 parts by weight of the masterbatch pellets were blended with 85 parts by weight of the natural pellets (pelletized at 220° C. into cylindrical pellets 3 mm in diameter×5 mm in length) of the above styrene-butadiene block copolymer resin by an automatic metering mixer (Matsui Seisakusho), and molded using an injection molding machine ("NETSTAL", Sumitomo Heavy Industries, at a mold clamping pressure of 150 t) and a semi-hot runner type mold having a number of cavities of 24. The injection resin temperature was 190° C., and the inner wall temperature of the core, cavity portions was made 135° C. upon the injection charging of the resin. The mold was cooled to 35° C. from immediately after charging the resin, and thereafter the molded photographic film spools were taken out (molding cycle: 7 seconds).

The photographic film spools were composed of 12.15 wt. % of the styrene-butadiene block copolymer resin in the masterbatch which had experienced heat histories of not lower than 150° C. three times, 85 wt. % of the natural pellets of the styrene-butadiene block copolymer resin which had experienced heat histories of not lower than 150° C. twice, 0.75 wt. % of magnesium stearate as a lubricant, 1.5 wt. % of polydimethylsiloxane as a lubricant, 0.15 wt. % of the hindered phenolic antioxidant, and 0.45 wt. % of furnace carbon black. In the photographic film spools, photographic properties were normal for 2 years. The winding torque of a photographic film was small, and the occurrence of winding troubles was 0% through photographing. Even when they contained in a cartridge were left in an automobile under the sunlight in midsummer, no thermal deformation nor fogging occurred. Furthermore, after storing for 1 year in a sealed container for a photographic film cartridge, offensive odor was very small.

Besides, since specific furnace carbon black, specific lubricant and specific hindered phenolic antioxidant were blended with the pellets of the styrene-butadiene block copolymer resin having a high melt flow index and then were pelletized through kneading at 200° C., the surface of the specific furnace carbon black was coated by magnesium stearate and polydimethylsiloxane. Thereby, not only the carbon black was uniformly dispersed in the polystyrene resin, but also moisture in the atmosphere was shielded so as not to adsorb resulting in that the occurrence of silver streaks, foaming and short shot caused by the water content of the resin upon injection molding became zero. Furthermore, the degradation of photographic properties and the generation of offensive odor were prevented by the neutralization of halogen compounds with magnesium strearate and by the inhibition of thermal degradation of the lubricant and polystyrene resin by the hindered phenolic antioxidant.

EXAMPLE 2

A core for a photographic photosensitive a long length strip material shown in FIGS. 2 and 3 was molded.

A styrene resin composition was prepared composed of 84.9 wt. % of styrene-butadiene block copolymer resin cylindrical pellets 3 mm in diameter×3 mm in length which had experienced heat history at 200° C.) having a butadiene rubber content of 6 wt. %, a styrene content of 94 wt. %, a melt flow index of 12 g/10 minutes, a density of 1.05 g/10 minutes, a Rockwell hardness of M53, an Izod impact strength of 6.5 kg.cm/cm, a bending elastic modulus of 21,500 kg/cm$^2$ and a Vicar softening point of 85° C., 1.0 wt. % of magnesium stearate as a lubricant, 2 wt. % of polyethylene wax having a number average molecular weight of 3,500 as a lubricant, 10 wt. % of ethylene-4-methylpentene-1 copolymer resin (cylindrical pellets 2.5 mm in diameter×5 mm in length which had experienced heat histories at 200° C. twice) having a melt flow index of 7.5 g/10 minutes and a density of 0.920 g/cm$^3$, 2 wt. % of $TiO_2$ in anatase type, 0.05 wt. % of tetrakis[methylene-3-(3.5-di-tert-butyl-4-butyl-4-hydroxyphenyl)propionate]methane as an antioxidant and 0.05 wt. % of n-octadecyl-3-(4'-hydroxy-3'.5'-ditertbutyl-phenol)propionate. The styrene resin composition was charged from two resin gates 21, 21 at a resin temperature of 190° C., and injection-molded at a mold temperature of 110° C.

Since the core for a photographic photosensitive strip material having a long length was excellent in injection moldability, molding troubles rarely occurred. Wear resistance was also excellent. Since three circular ribs 23 0.1 mm in height 1.5 mm in intervals therbetween were provided on the inner surface of the outer cylinder 22 on the side opposite to the resin gate side, the resin fluidity was improved, and the occurrence of weld lines was rare. Furthermore, Izod impact strength and compressive strength were excellent, and it was enough to put to practical use for a positive movie film 10,000 feet in length. Compared with a core for a photographic photosensitive strip material having a long length which was injection-molded at a conventional mold temperature of lower than 70° C., the occurrence of weld lines was rare, and impact strength was improved by 20%.

EXAMPLES 3–11, COMPARATIVE EXAMPLES 1–4

Resin compositions shown in Table 1 were prepared by blending butadiene rubber-modified polystyrene resin wherein butadiene rubber particles 0.52 μm in mean particle size were dispersed having a butadiene rubber content of 5 wt. %, a styrene content of 95 wt. %, a melt flow index (ASTM D-1238, Condition G) of 11 g/10 minutes, an Izod impact strength (JIS K-6871) of 325 kg/cm$^2$, a bending elastic modulus (ASTM D-790) of 23,800 kg/cm$^2$ and a Vicat softening point (ASTM D-1525) of 93° C. with a fatty acid metal salt lubricant of magnesium stearate and a silicone lubricant of polydimethylsiloxane ("KF-96", Shin-Etsu Chemical) having a viscosity of 20,000 centistokes as the lubricant, furnace carbon black having a mean particle size of 21 mμ, a pH of 8, a volatile component of 0.46% and an oil absorption value of 85 ml/100 g as the light-shielding material and a hindered phenolic antioxidant ("Irganox 1010", Ciba-Geigy) as the antioxidant in the ratio shown in Table 1. Using the above resin compositions, molded articles for test were molded, and Izod impact strength, tensile strength, and Vicat softening point of the molded articles were measured.

Moreover, the above resin compositions were kneaded by a double-screw extruder, and pelletized into cylindrical pellets 2.5 mm in diameter×3 mm in length of butadiene rubber-modified polystyrene resin composition. Using each pellets, a photographic film spool of FIG. 1, a photographic film cartridge of FIG. 4, a photographic film cartridge of FIG. 5 and a photographic film unit with a lens of FIG. 6 were molded at each Example. After a photographic film having an ISO photographic speed 400 was applied to each molded article, the results of photographing were evaluated.

Evaluation was as follows:

⊚ . . . Very excellent,

▲ . . . Practical,

○ . . . Excellent

X . . . Improvement is necessary x . . . Difficult to put to practical use or impractical The results are summarized in Table 1.

TABLE 1

| | Unit | Inventive 3 | 4 | 5 | 6 | 7 | 8 | 9 | 10 | 11 |
|---|---|---|---|---|---|---|---|---|---|---|
| Mean Particle Size of Rubber-Modified Polystyrene resin | μm | 0.52 | 0.52 | 0.52 | 0.52 | 0.52 | 0.52 | 0.52 | 0.52 | 0.52 |
| Mg Stearate Content | wt. % | 0.05 | 0.10 | 0.5 | 0.10 | 0.10 | 0.10 | 0.10 | 0.10 | 0.10 |
| Polydimethylsiloxane Content | wt. % | 0.5 | 0.5 | 0.5 | 0.05 | 1.0 | 0.5 | 0.5 | 0.5 | 0.5 |
| Furnace Carbon Black Content | wt. % | 0.5 | 0.5 | 0.5 | 0.5 | 0.5 | 0.25 | 0.75 | 0.5 | 0.5 |
| Antioxidant Content | wt. % | 0.05 | 0.05 | 0.05 | 0.05 | 0.05 | 0.05 | 0.05 | 0.01 | 0.10 |
| Izod Impact Strength | kg · cm/cm | 9.7 | 10.1 | 10.3 | 9.7 | 11.2 | 10.8 | 9.3 | 9.9 | 10.5 |
| Tensile Strength | kg/cm$^2$ | 336 | 326 | 312 | 359 | 296 | 313 | 344 | 321 | 337 |
| Vicat Softening Point | °C. | 98 | 97 | 95 | 101 | 91 | 93 | 102 | 96 | 100 |
| Suitability for Spool (FIG. 1) | — | ○ | ⊚ | ⊚ | ○ | ⊚ | ○ | ⊚ | ⊚ | ⊚ |
| Suitability for Film Unit with lens (FIG. 6) | — | ○ | ⊚ | ○ | ○ | ⊚ | ○ | ⊚ | ⊚ | ⊚ |
| Suitability for Cartridge (FIG. 5) | — | ○ | ⊚ | ○ | ○ | ⊚ | ○ | ⊚ | ⊚ | ⊚ |
| Suitability for Cartridge (FIG. 4) | — | ○ | ⊚ | ○ | ○ | ⊚ | ○ | ⊚ | ⊚ | ⊚ |
| Photographic Properties | — | ○ | ⊚ | ⊚ | ⊚ | ⊚ | ⊚ | ○ | ○ | ⊚ |
| Cost | — | ○ | ○ | ○ | ⊚ | ● | ○ | ○ | ○ | ○ |
| Total Evaluation | — | ○ | ⊚ | ○ | ○ | ○ | ○ | ⊚ | ⊚ | ⊚ |

| | Unit | Comparative 1 | 2 | 3 | 4 | Test Method |
|---|---|---|---|---|---|---|
| Mean Particle Size of Rubber-Modified Polystyrene resin | μm | 0.52 | 0.52 | 0.52 | 0.52 | — |
| Mg Stearate Content | wt. % | 0 | 0.10 | 0 | 0.10 | — |
| Polydimethylsiloxane Content | wt. % | 0.5 | 0 | 0.5 | 0 | — |
| Furnace Carbon Black Content | wt. % | 0.5 | 0.5 | 0.5 | 0.25 | — |
| Antioxidant Content | wt. % | 0.05 | 0.05 | 0 | 0.05 | — |
| Izod Impact Strength | kg · cm/cm | 9.8 | 3.7 | 9.5 | 3.9 | ASTM D-256 |
| Tensile Strength | kg/cm$^2$ | 341 | 362 | 327 | 358 | JIS K-6871 |
| Vicat Softening Point | °C. | 100 | 103 | 97 | 102 | ASTM D-1525 |
| Suitability for Spool (FIG. 1) | — | ▲ | × | ▲ | × | A |
| Suitability for Film Unit with lens (FIG. 6) | — | ▲ | ▲ | ▲ | ▲ | B |
| Suitability for Cartridge (FIG. 5) | — | ▲ | ▲ | ▲ | ▲ | C |
| Suitability for Cartridge (FIG. 4) | — | ▲ | ▲ | ▲ | ▲ | D |
| Photographic Properties | — | ● | ⊚ | × | ⊚ | E |
| Cost | — | ○ | ⊚ | ○ | ⊚ | F |
| Total Evaluation | — | ▲ | × | × | ▲ | G |

Testing methods are as follows:

A. Suitability for Spool (FIG. 1)

After applying a photographic negative color film of 36 exposures with as ISO photographic speed 400 to each photographic film spool, the photographic film was contained in a photographic film cartridge to shield from light completely. Then, the photographic film was loaded in a camera, and photographing was conducted in the outdoors. The suitability was evaluated by the winding torque of the photographic film, fogging, wear resistance, deformation and injection moldability.

B. Suitability for Film Unit with Lens (FIG. 6)

After applying a photographic negative color film of 24 exposures with an ISO photographic speed 400 to each photographic film unit with a lens, photographing was conducted in the outdoors. The suitability was evaluated by the winding torque of the photographic film, fogging, wear resistance, thermal deformation, dropping strength and injection moldability.

C. Suitability for Cartridge (FIG. 5)

After applying a photographic negative color film of 36 exposures with an ISO photographic speed 400 wound around a photographic film spool to each photographic film cartridge made of resin, the cartridge was made into a complete light-shielding package by ultrasonic welding. Then, the photographic film was loaded in a camera, and photographing was conducted in the outdoors. The suitability was evaluated by the winding torque of the photographic film, fogging, wear resistance, thermal deformation, dropping strength, suitability for a camera and injection moldability.

D. Suitability for Cartridge (FIG. 4)

After applying a photographic negative color film of 24 exposures with an ISO photographic speed 400 to a cartridge for a pocket instant automatic photographic film (for K-16), photographing was conducted in the outdoors. The suitability was evaluated by the winding torque of the photographic film, fogging, thermal deformation, suitability for a camera and injection moldability.

E. Photographic Properties

After storing under 35° C., 70% RH conditions for 1 month, a photographic negative color film with an ISO photographic speed 400 applied to each molded article was developed. The properties were evaluated by the increase of fogging and the variation of sensitivity compared with the photographic properties before storing.

F. Cost

Evaluated in a comparison of the total cost of additives, molding cycle, the frequency of molding troubles, and the like.

G. Total Evaluation

Evaluation in total of odor, physical strength, properties necessary as the molded article for a photographic photosensitive material, photographic properties, injection moldability, the occurrence of lumps, cost, appearance (commercial value) and the like.

As a result of Table 1, the following facts were found.

Unless magnesium stearate which is a kind of lubricant as well as a halogen neutralizing agent is added (refer to Comparative Examples 1 and 3, photographic properties (fogging), the dispersibility of carbon black, and appearance are degraded, and it is difficult to put to practical use. By blending 0.5 wt. %, photographic properties and slipping character are improved, and the dispersibility of carbon black is further improved. Appearance is excellent, but ultrasonic welding ability is slightly degraded.

Unless polydimethylsiloxane is added (refer to Comparative Example 2), Izod impact strength is small. Moldability is inferior (mold release ability is degraded to induce deformation, to lengthen molding cycle and to elevate injection pressure), and slipping character is insufficient. Light-shielding ability and wear resistance are degraded. Moreover, hygroscopicity increases to degrade photographic properties. Thus, it is difficult to put to practical use as a molded article for a photographic photosensitive material as it is, and an improvement is necessary.

When the blending amount of furnace carbon black is decreased to 0.25 wt. % and the blending amount of polydimethylsiloxane is made 0% (refer to Comparative Example 4), light-shielding ability becomes inferior in addition to the above disadvantages resulting in the difficulty to put to practical use.

The blending amount of furnace carbon black of 0.25 wt. % is, in general, in an excellent level not to inducing a problem even when weld lines or insufficient dispersion to some degree occur in a usual thickness of molded articles for a photographic photosnsitive material to be put to practical use. However, when the thickness is thinned (to 0.5 mm or less) in order to shorten molding cycle or to reduce cost, light-shielding ability becomes defective (although the light-shielding ability is indicated excellent (○)) by a combination of polydimethylsiloxane with carbon black, when another lubricant is substituted for polydimethylsiloxane, the light-shielding ability is degraded to the practical level (▲)).

When both blending amount of hindered phenolic antioxidant and magnesium stearate are zero (Comparative Example 3), photographic properties are further degraded compared with Comparative Example 2 wherein only the blending amount of magnesium stearate is zero, and it is difficult to put to practical use.

EXAMPLES 12–20, COMPARATIVE EXAMPLES 5–7

Butadiene rubber-modified polystyrene resin having a content of 8 wt. % of butadiene rubber with a mean particle size of 2.2 μm (except 0.52 μm in Examples 16 and 17, and 3.4 μm in Example 20 and Comparative Example 4), a styrene content of 92 wt. %, a melt flow index of 9.1 g/10 minutes, a bending elastic modulus of 22,100 kg/cm$^2$, a Vicat softening point of 79° C. and a tensile strength of 330 kg/cm$^2$, an Izod impact strength of 4.5 kg.cm/cm was blended with homopolystyrene resin having a melt flow index of 7.5 g/10 minutes, a bending elastic modulus of 33,500 kg/cm$^2$, a Vicat softening point of 95° C., a tensile strength of 458 kg/cm$^2$ and an Izod impact strength of 1.4 kg.cm/cm in a ratio shown in Table 2. Each blend was pelletized into cylindrical pellets 2.5 mm in diameter×3 mm in length by a double-screw extruder.

To 100 parts by weight of the above blend pellets, a fatty acid metal salt of zinc stearate and a fatty acid amide lubricant of oleic amide as the lubricant, "ELECTROSTRIPPER TS-2" (Kao) as the antistatic agent, furnace carbon black having a mean particle size of 23 mμ, a pH of 7.5, a volatile component content of 0.63% and an oil absorption value of 88 ml/100 g as the light-shielding material, and a hindered phenolic antioxidant of tetrakis[methylene-3(3'.5-di-t-butyl-4-hydroxyphenyl) propionate] methane and a phosphorus-containing antioxidant of triphenylphosphite as the antioxidant were added at a ratio shown in Table 2.

Using each pellets, a photographic film spool of FIG. 1, a photographic film cartridge of FIG. 4, a photographic film cartridge of FIG. 5 and a photographic film unit with a lens of FIG. 6 were molded at each Example. After a photographic film having an ISO photographic speed 400 was applied to each molded article, photographing was conducted, and the results are shown in Table 2.

TABLE 2

| | | Inventive | | | | | | | | |
|---|---|---|---|---|---|---|---|---|---|---|
| | Unit | 12 | 13 | 14 | 15 | 16 | 17 | 18 | 19 | 20 |
| Rubber-Modified Polystyrene | wt. part | 100 | 50 | 75 | 75 | Same as Ex. 2 | Same as Ex. 2 | 60 | 75 | 75 |

TABLE 2-continued

| | | | | | | | | | | |
|---|---|---|---|---|---|---|---|---|---|---|
| Resin Content | | | | | | 100 | 75 | | | |
| Mean Particle Size of Butadiene Rubber | μm | 2.2 | 2.2 | 2.2 | 2.2 | 0.52 | 0.52 | 2.2 | 2.2 | 3.4 |
| Homopolystyrene Resin Content | wt. part | 0 | 50 | 25 | 25 | 0 | 25 | 40 | 25 | 25 |
| Zn Stearate Content | wt. part | 0.10 | 0.10 | 0.10 | 0.10 | 0.10 | 0.10 | 0.10 | 0.10 | 0.10 |
| Oleic Amide Content | wt. part | 0.10 | 0.10 | 0.10 | Same PDS*[1] as Ex. 2 0.5 | Same PDS*[1] as Ex. 2 0.5 | 0.10 | Erucic Amide 0.10 | 0.10 | 0.10 |
| Antistatic Agent (TS-2) Content | wt. part | 0.15 | 0.15 | 0.15 | 0.15 | 0.15 | 0.15 | 0.15 | 0.15 | 0.15 |
| Farness Carbon Black Content | wt. part | 0.5 | 0.5 | 0.5 | 0.5 | 0.5 | 0.5 | 0.5 | 0.5 | 0.5 |
| Hindered Phenolic Antioxidant Content | wt. part | 0.05 | 0.05 | 0.05 | 0.05 | 0.05 | 0.05 | 0.05 | 0.05 | 0.05 |
| Phosphorus-Contg. Antioxidant Content | wt. part | 0.05 | 0.05 | 0.05 | 0.05 | 0.05 | 0.05 | 0.05 | 0.05 | 0.05 |
| Olter Additives | wt. part | — | — | — | Deodorant*[2] | Deodorant*[2] 0.30 | — | — | Zeolite 0.20 | — |
| Izod Impact Strength | kg · cm/cm | 4.6 | 3.3 | 4.0 | 10.8 | 11.3 | 3.4 | 3.6 | 3.9 | 4.5 |
| Tensile Strength | $kg/cm^2$ | 338 | 403 | 368 | 356 | 341 | 409 | 394 | 375 | 376 |
| Vicat Softening Point | °C. | 81 | 84 | 82 | 91 | 99 | 98 | 83 | 84 | 86 |
| Glossiness | % | 53 | 71 | 61 | 58 | 85 | 91 | 68 | 61 | 51 |
| Suitability for Spool (FIG. 1) | — | ⊚ | ○ | ○ | ⊚ | ⊚ | ○ | ○ | ⊚ | ○ |
| Suitability for Film Unit with Lens (FIG. 6) | — | ⊚ | ○ | ⊚ | ⊚ | ⊚ | ⊚ | ○ | ⊚ | ○ |
| Suitability for Cartridge (FIG. 5) | — | ⊚ | ○ | ⊚ | ⊚ | ⊚ | ⊚ | ○ | ⊚ | ○ |
| Suitability for Cartridge (FIG. 4) | — | ⊚ | ○ | ⊚ | ⊚ | ⊚ | ⊚ | ○ | ⊚ | ○ |
| Photographic Properties | — | ⊚ | ⊚ | ⊚ | ⊚ | ⊚ | ⊚ | ○ | ⊚ | ⊚ |
| Cost | — | ⊚ | ⊚ | ⊚ | ○ | ⊚ | ⊚ | ⊚ | ○ | ⊚ |
| Total Evaluation | — | ⊚ | ○ | ⊚ | ⊚ | ⊚ | ⊚ | ○ | ⊚ | ⊚ |

| | | Comparative | | | |
|---|---|---|---|---|---|
| | Unit | 5 | 6 | 7 | Test Method |
| Rubber-Modified Polystyrene Resin Content | wt. part | 75 | — | 10 | — |
| Mean Particle Size of Butadiene Rubber | μm | 3.4 | — | 3.4 | — |
| Homopolystyrene Resin Content | wt. part | 25 | 100 | 90 | — |
| Zn Stearate Content | wt. part | 0 | 0.10 | 0.10 | — |
| Oleic Amide Content | wt. part | 0 | 0.10 | 0.10 | — |
| Antistatic Agent (TS-2) Content | wt. part | 0 | 0.15 | 0.15 | — |
| Farness Carbon Black Content | wt. part | 0.5 | 0.5 | 0.5 | — |
| Hindered Phenolic Antioxidant Content | wt. part | 0 | 0.05 | 0.05 | — |
| Phosphorus-Contg. Antioxidant Content | wt. part | 0 | 0.05 | 0.05 | — |
| Olter Additives | wt. part | — | — | — | — |
| Izod Impact Strength | kg · cm/cm | 4.2 | 1.2 | 1.9 | ASTM D-256 |
| Tensile Strength | $kg/cm^2$ | 368 | 438 | 418 | JIS K-6871 |
| Vicat Softening Point | °C. | 82 | 92 | 89 | ASTM D-1525 |
| Glossiness | % | 48 | 98 | 96 | H |
| Suitability for Spool (FIG. 1) | — | ▲ | × | ▲ | A |
| Suitability for Film Unit with Lens (FIG. 6) | — | ▲ | × | × | B |
| Suitability for Cartridge (FIG. 5) | — | ▲ | × | ▲ | C |
| Suitability for Cartridge (FIG. 4) | — | ▲ | × | ▲ | D |
| Photographic Properties | — | × | ⊚ | ⊚ | E |
| Cost | — | ⊚ | ⊚ | ⊚ | F |
| Total Evaluation | — | × | × | ×~▲ | G |

*[1]Polydimethylsiloxane
*[2]Mixture of organic carboxylic acid and zinc compound Testing methods are as follows:

H. Glossiness

Evaluated by the measuring method of specular gloss at 45 degrees in No. 4 of JIS Z-8741.

The other testing methods are the same as employed in Table 1.

As a result of Table 2, the following facts were found. Provided that the butadiene rubber-modified polystyrene resin used in Example 20 and Comparative Example 5 was prepared by the emulsion polymerization method, and that used in the others was prepared by the continuous block polymerization method.

The molded articles of Examples 15 and 16 wherein polydimethylsiloxane was used as the lubricant were improved in Izod impact strength unexpectedly by twice or more compared with those using oleic amide or erucic amide as the lubricant. However, since polydimethylsiloxane is expensive, it is preferable to use fatty acid amide lubricant which exercises a greater improvement in slipping character, antistatic ability, mold releasability, resin fluidity and the dispersibility of furnace carbon black and is inexpensive because the cost and the blending amount are one several times for the molded articles not so requiring strength, such as photographic film spools and photographic film cartridges.

The mean particle size of burtadiene rubber greatly influences glossiness and Izod impact strength. In the case of requiring a high gloss appaearance, that having a small particle size is used, and in the case of the molded articles which dislike light reflection, such as photographic film spools, that having a large particle size, inexpenxiveness, a great physical strength and an excellent gloss is selected.

We claim:

1. An injection molded article for a photographic photosensitive material formed of a resin composition comprising (a) 50 wt. % or more of a rubber-containing aromatic monovinyl resin having a melt flow index of 3 to 40 g/10 minutes, a bending elastic modulus of 20,000 kg/cm$^2$ or more, an Izod impact strength of 2.0 Kg.cm/cm, a weight average molecular weight/number average molecular weight ratio of 1.3 to 8, and a Vicat softening point of 85° C. or more, and containing 1 to 12 wt. % of a rubber material, (b) 0.1 to 10 wt. % of a light-shielding material, and (c) 0.01 to 20 wt. % of at least one of a lubricant and an antistatic agent.

2. An injection molded article for a photographic photosensitive material formed of a resin composition comprising of (a) 50 wt. % or more of a rubber-containing aromatic monovinyl resin having a melt flow index of 3 to 40 g/10 minutes, a bending elastic modulus of 20,000 kg/cm$^2$ or more and a Vicat softening point of 78° C. or more and containing 1 to 12 wt. % of a rubber material, (b) 0.1 to 10 wt. % of a light-shielding material, and (c) 0.01 to 10 wt. % of an inorganic substance having ion-exchange ability.

3. An injection molded article for a photographic photosensitive material formed of a resin composition comprising (a) 50 wt. % or more of a rubber-containing styrene resin having a melt flow index of 3 to 40 g/10 minutes, a bending elastic modulus of 20,000 kg/cm$^2$ or more and a Vicat softening point of 78° C. or more and containing 1 to 12 wt. % of a polybutadiene having a mean particle size of 0.1 to 7 μm, (b) 0.1 to 10 wt. % of carbon black as a light-shielding material having a mean particle size of 10 to 90 μm, and (c) 0.01 to 20 wt. % of at least one of an organic polysiloxane, a fatty acid metal salt and a fatty acid amide compound.

4. An injection molded article for a photographic photosensitive material formed of a resin composition comprising of (a) 50 wt. % or more of a rubber-containing aromatic monovinyl resin containing a rubber material, (b) 0.01 to 20 wt. % of at least one of a lubricant and an antistatic agent, (c) 3 wt. % or more of a thermoplastic resin having experienced heat histories at 150° C. or more at least twice, (d) 0.1 to 10 wt. % of a light-shielding material, and (e) 0.01 to 20 wt. % of at least one of an antioxidant, a deodorant, an agent imparting fragrance, an oxygen scavenger and an inorganic substance having ion-exchange ability.

5. An injection molded article for a photographic photosensitive material formed of a resin composition comprising (a) 50 wt. % or more of a rubber-containing styrene resin as a rubber-containing aromatic monovinyl resin, (b) 0.005 to 10 wt. % of a silicone lubricant, (c) 0.005 to 10 wt. % of a lubricant selected from the group consisting of a fatty acid amide lubricant, a hydrocarbon lubricant, a fatty acid lubricant, a fatty metal salt lubricant and a alcohol lubricant, and (d) 0.1 to 20 wt. % of a light-shielding material, wherein the total amount of (a), (b), (c) and (d) is 70 wt. % or more.

6. An injection molded article for a photographic photosensitive material formed of a resin composition comprising, (a) 5 wt. % or more of a rubber-containing styrene resin containing 0.1 to 20 wt. % of a synthetic rubber, (b) 0.005 to 10 wt. % of a silicone lubricant selected from the group consisting of polydimethylsiloxane, a modified polydimethylsiloxane and a combination thereof, (c) 0.005 to 20 wt. % of a lubricant other than silicone lubricant selected from the group consisting of a higher fatty acid lubricant, a higher fatty acid metal salt lubricant, a higher fatty acid amide lubricant, a hydrocarbon lubricant, an alcohol lubricant, and combinations thereof, (d) 0.01 to 49.9 wt. % of a light-shielding material selected from the group consisting of an inorganic pigment having a refractive index of not less than 1.50, a metal powder, a metal paste, carbon black, graphite and combinations thereof, (e) 0.001 to 10 wt. % of an agent for preventing degradation selected from the group consisting of an antioxidant, an age resistor, an ultraviolet stabilizer, a radical scavenger, an agent exercising antioxidation synergistically, a hydrous double salt and combinations thereof, wherein the total amount of (a) , (b) , (c) , (d) and (e) is 80 wt. % or more.

7. An injection molded article for a photographic photosensitive material formed of a resin composition comprising, (a) 50 wt. % or more of a rubber-containing styrene resin, (b) 1 to 40 wt. % of a resin selected from the group consisting of a polyolefin synthetic rubber, an acid-modified polyolefin resin, a low number average molecular weight polyolefin resin having a number average molecular weight of 10,000 or less, and combinations thereof, (c) 0.01 to 20 wt. % of a lubricant, (d) 0.01 to 30 wt. % of a white pigment light-shielding material, and/or 0.01 to 30 wt. % of a black pigment light-shielding material, (e) 0.002 to 10 wt. % of an agent for preventing degradation selected from the group consisting of an antioxidant, an age resistor, an ultraviolet stabilizer, a radical scavenger, an agent exercising antioxidation synergistically, a hydrous double salt and combinations thereof, wherein the total amount of (a), (b), (c), (d) and (e) is 80 wt. % or more.

8. The injection molded article of claim 1, 2 or 4, wherein the rubber-containing aromatic monovinyl resin is a rubber-modified aromatic monovinyl resin.

9. The injection molded article of claim 1, 2 or 4, wherein the rubber-containing aromatic monovinyl resin is an aromatic monovinyl resin wherein a rubber material is merely blended.

10. The injection molded article of claim 1, 2, or 4, wherein the rubber material is selected from the group consisting of polybutadiene, butadiene-styrene random copolymer rubber, butadiene-acrylonitrile copolymer rubber and mixtures thereof.

11. The injection molded article of claim 1, 2, 3 or 4 which contains 0.001 to 3 wt. % of an organic cyclic phosphorus compound as an antioxidant.

12. The injection molded article of claim 1, 2, 3 or 4 which contains 0.001 to 3 wt. % of a phenolic antioxidant which is a radical group chain terminator and 0.001 to 3 wt. % of a phosphorus-containing antioxidant which is a peroxide decomposer.

13. The injection molded article of claim 1, 2, 3 or 4 wherein the rubber-containing aromatic monovinyl resin or the rubber-containing styrene resin has a number average molecular weight of 20,000 to 1,000,000 and a ratio of weight average molecular weight/number average molecular weight of 1.3 to 8.

14. A method of injection molding the molded article of claim 3 which comprises (a) injecting the resin composition heated to a temperature of 150° C. or higher, into a mold having a core portion and a cavity portion, in which the core portion and the cavity portion each have a wall, each wall having a temperature of 70° to 200° C., and (b) taking out the molded article formed in the mold when the wall temperature becomes a glass transition temperature of the styrene resin in the resin composition or lower.

15. A package of a photographic photosensitive material which comprises the photographic photosensitive material, the molded article of claim 1, 2, 3 or 4, and a moistureproof packaging material having a moisture permeability of 5 $g/m^2$.24 hours or less which packages and seals the molded article.

16. The package of claim 15 which is provided with at least one a member selected from the group consisting of a deodorant, an agent imparting fragrance, an oxygen scavenger, a moisture absorber and an inorganic substance having ion-exchange ability, in at least one material selected from the group consisting of the photographic photosensitive material, the molded article and the moistureproof packaging material.

17. The injection molded article of claim 1 wherein the resin composition further comprises 0.002 to 10 wt. % in a total of two or more members selected from the group consisting of an antioxidant, an age resistor, an ultraviolet stabilizer, a radical scavenger, an agent exercising antioxidation synergistically and a hydrous double salt.

18. The injection molded article of claim 1 wherein the rubber-containing aromatic monovinyl resin is a styrene resin produced by polymerizing 60 to 99 wt. % of a styrene monomer by bulk or suspension polymerization, adding 40 to 1 wt. % of a monomer copolymerizable with the styrene monomer at the time of a polymerization degree of 60% or more, and thereafter completing the polymerization.

19. The injection molded article of claim 1 or 5 wherein the rubber-containing aromatic monovinyl resin is a rubber-modified polystyrene modified by a diene rubber and/or a polyolefin rubber produced by continuous bulk polymerization.

20. The injection molded article of claim 1 or 4 which is molded by injection molding in a molding machine having an upstream side, wherein the resin composition is produced by:

(a) producing a light-shielding material-containing masterbach pellets by dispersing the light-shielding material which has a surface that has been coated with a surface-coating material into a thermoplastic resin, (b) producing a masterbach comprising the light-shielding material-containing masterbach pellets, the rubber-containing aromatic monovinyl resin for dilution, and at least one of the lubricant and the antistatic agent, (c) melting and kneading a mixture of the masterbach produced in (b) and the rubber-containing aromatic monovinyl resin for dilution by an extruder having a screw on the upstream side of a molding machine, and (d) molding by injection molding.

21. The injection molded article of claim 1 wherein the rubber-containing aromatic monovinyl resin is a synthetic rubber-graft modified aromatic vinyl resin which has been produced by graft polymerizing a synthetic rubber with a vinyl compound selected from the group consisting of an aromatic vinyl compound, a vinyl cyanide compound and other copolymerizable vinyl compound.

22. The injection molded article of claim 1 wherein the rubber-containing aromatic monovinyl resin is a rubber-containing styrene resin prepared by, (a) supplying a screw extruder having exothermic function exercised by shearing through mixing, (b) heating, (c) adjusting the rubber-containing styrene resin to a pressure capable of keeping in a liquid state, and (d) supplying a heated machine for eliminating monomer to remove evaporable substances adversely affecting photographic photosensitive materials by evaporation.

23. The injection molded article of claim 1 which is molded by injection molding, wherein evaporable substances which adversely effect photographic photosensitive materials in the rubber-containing aromatic monovinyl resin composition have been removed by using an extruder having an entrance, wherein a hopper having a heating and/or evacuating function is provided at the entrance of the extruder.

24. The injection molded article of claim 1 wherein the rubber-containing aromatic monovinyl resin is a rubber-containing styrene-butadiene copolymer resin containing conjugated diene unit-tin bond chains produced by polymerizing 1,3-butadiene and styrene by an organic lithium compound in the presence of an ether compound or a tertiary amine compound in a hydrocarbon solvent, and then coupling with a tin compound, wherein a conjugated diene compound is added to polymerize immediately before the coupling.

25. The injection molded article of claim 7 wherein the agent for preventing degradation comprising of (a) 0.001 to 3 wt. % of a phenolic antioxidant, (b) 0.001 to 3 wt. % of a phosphorus-containing antioxidant and (c) 0.001 to 5 wt. % of a hydrous double salt compound, a fatty acid metal salt or a combination thereof, wherein the total amount of (a), (b) and (c) is 0.003 to 7 wt. %.

26. The molded article of claim 1, 4 or 5 which contains 1 to 50 wt. % of a recycled rubber-containing aromatic monovinyl resin.

27. The injection molded article of claim 1, 2, 3, 4, 5, 17, 18, 21, 22, 23, 24, 26 or 25 having a total sulfur content of the light-shielding material of not more than 1.0%.

28. The injection molded article of claim 1, 2, 3, 4, 5, 17, 18, 21, 22, 23, 24, 26 or 25 having a cyanogen compound content of the light-shielding material of not more than 0.1%.

29. The injection molded article of claim 1, 2, 3, 4, 5, 17, 18, 21, 22, 23, 24, 26 or 25 wherein the light-shielding material comprises oil furnace carbon black having a pH of 4 to 9, a mean particle size of 10 to 120 μm, a total sulfur content or not more than 1.0% and a DBP oil absorption value of not less than 50 ml/100 g.

30. The injection molded article of claim 1, 2, 3, 4, 5, 17, 18, 21, 22, 23, 24, 26, or 25 wherein the light-shielding material has a surface which is coated with a surface-coating material.

* * * * *